United States Patent
Yamamoto et al.

(10) Patent No.: US 9,899,665 B2
(45) Date of Patent: Feb. 20, 2018

(54) SODIUM SECONDARY BATTERY COMPRISING CARBONACEOUS MATERIAL

(75) Inventors: Taketsugu Yamamoto, Tsukuba (JP);
Hideaki Nakajima, Tsukuba (JP);
Hiroshi Inukai, Tsuchiura (JP);
Shigekazu Ohmori, Tsukuba (JP);
Chikara Murakami, Funabashi (JP);
Daisuke Nakaji, Tsukuba (JP);
Hidekazu Yoshida, Tsukuba (JP);
Maiko Saka, Tsukuba (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 924 days.

(21) Appl. No.: 13/056,912

(22) PCT Filed: Jul. 29, 2009

(86) PCT No.: PCT/JP2009/063839
§ 371 (c)(1),
(2), (4) Date: Jan. 31, 2011

(87) PCT Pub. No.: WO2010/013837
PCT Pub. Date: Feb. 4, 2010

(65) Prior Publication Data
US 2011/0135990 A1  Jun. 9, 2011

(30) Foreign Application Priority Data

Jul. 30, 2008 (JP) .................................. 2008-195966
Mar. 25, 2009 (JP) .................................. 2009-073710

(51) Int. Cl.
*H01M 4/136* (2010.01)
*H01M 4/58* (2010.01)
(Continued)

(52) U.S. Cl.
CPC ............. *H01M 4/136* (2013.01); *H01M 4/58* (2013.01); *H01M 4/587* (2013.01); *H01M 10/0569* (2013.01); *Y10T 29/49108* (2015.01)

(58) Field of Classification Search
CPC .......... H01M 4/583; H01M 4/02; H01M 4/04; H01M 2/18
(Continued)

(56) References Cited

U.S. PATENT DOCUMENTS 5,558,961 A * 9/1996 Doeff ................. C01G 45/1221
429/224
6,877,492 B1  4/2005 Osterwald
(Continued)

FOREIGN PATENT DOCUMENTS

CN        1723578 A     1/2006
CN      101030659 A     9/2007
(Continued)

OTHER PUBLICATIONS

"Comparison between carbonization of wood charcoal with Al-triisopropoxide and alumina", Bronsveld et al., Journal of the European Ceramic Society 26 (2006) 719-723.*
(Continued)

*Primary Examiner* — Kenneth J Douyette
(74) *Attorney, Agent, or Firm* — Sughrue Mion, PLLC

(57) ABSTRACT

Disclosed is a sodium secondary battery. The sodium secondary battery comprises a first electrode and a second electrode comprising a carbonaceous material. The carbonaceous material satisfies one or more requirements selected from the group consisting of requirements 1, 2, 3 and 4. Requirement 1: R value (=ID/IG) obtained by Raman spectroscopic measurement is 1.07 to 3. Requirement 2: A value and $\sigma_A$ value obtained by small angle X-ray scattering measurement are −0.5 to 0 and 0 to 0.010, respectively.
(Continued)

Requirement 3: for an electrode comprising an electrode mixture obtained by mixing 85 parts by weight of the carbonaceous material with 15 parts by weight of poly(vinylidene fluoride), the carbonaceous material in the electrode after being doped and dedoped with sodium ions is substantially free from pores having a size of not less than 10 nm. Requirement 4: $Q_1$ value obtained by a calorimetric differential thermal analysis is not more than 800 joules/g.

15 Claims, 1 Drawing Sheet

(51) Int. Cl.
*H01M 4/04* (2006.01)
*H01M 4/587* (2010.01)
*H01M 10/0569* (2010.01)

(58) Field of Classification Search
USPC ..... 429/144, 231.8, 221, 219; 264/104, 29.1
See application file for complete search history.

(56) References Cited

U.S. PATENT DOCUMENTS

| | | | |
|---|---|---|---|
| 2002/0015888 A1* | 2/2002 | Omaru et al. | 429/231.8 |
| 2002/0027066 A1* | 3/2002 | Kanno | C01B 31/02 201/1 |
| 2002/0039686 A1 | 4/2002 | Sonobe et al. | |
| 2002/0192553 A1* | 12/2002 | Barker et al. | 429/224 |
| 2004/0202602 A1 | 10/2004 | Masa-aki et al. | |
| 2005/0136330 A1* | 6/2005 | Mao | C25D 17/10 429/231.95 |
| 2005/0238961 A1 | 10/2005 | Barker et al. | |
| 2006/0165584 A1 | 7/2006 | Gogotsi et al. | |
| 2007/0015056 A1* | 1/2007 | Takei | C01B 31/04 429/231.8 |
| 2007/0148541 A1 | 6/2007 | Wakita et al. | |
| 2007/0218361 A1* | 9/2007 | Inoue et al. | 429/231.1 |
| 2008/0145757 A1* | 6/2008 | Mah et al. | 429/219 |
| 2010/0248041 A1 | 9/2010 | Kikuchi et al. | |
| 2010/0261051 A1 | 10/2010 | Okada et al. | |

FOREIGN PATENT DOCUMENTS

| | | |
|---|---|---|
| EP | 0 791 972 A1 | 8/1997 |
| EP | 2 214 235 A1 | 8/2010 |
| JP | 05-109408 A | 4/1993 |
| JP | 9-283146 A | 10/1997 |
| JP | 10-223226 A | 8/1998 |
| JP | 11-040156 A | 2/1999 |
| JP | 2004-533706 A | 11/2004 |
| JP | 2006-066334 A | 3/2006 |
| JP | 2006-236752 A | 9/2006 |
| JP | 2007-035588 A | 2/2007 |
| JP | 2007-188861 A | 7/2007 |
| JP | 2007-234512 A | 9/2007 |
| JP | 2007-531678 A | 11/2007 |
| JP | 2009-129741 A | 6/2009 |
| JP | 2009-132593 A | 6/2009 |
| JP | 2009-135074 A | 6/2009 |

OTHER PUBLICATIONS

Extended European Search Report dated Feb. 13, 2013 issued in European Patent Application No. 09803069.5.
Alcantara et al. "Carbon Microspheres obtained from Resorcinol-Formaldehyde as High-capacity Electrodes for sodium-Ion Batteries", Electrochemical and Solid-State Letters, Jan. 2005, pp. A222-A225 vol. 8, No. 4, pages.
Stevens et al. "The Mechanisms of Lithium and sodium Insertion in Carbon Materials", Journal of the Electrochemical Society, ECS, Jun. 2001, pp. A803-A811 vol. 148 No. 8.
Thomas et al. "Electrochemical insertion of sodium into hard carbons", Electrochimica Acta, Aug. 2002, pp. 3303-3307, vol. 47, No. 20, Elsevier Science Publishers, Barking, GB.
E. Zhecheva et al., "EPR study on petroleum cokes annealed at different temperatures and used in lithium and sodium batteries", Carbon 40 (2002) pp. 2301-2306.
Communication dated Jul. 18, 2015 from the Korean Intellectual Property Office in application No. 10-2011-7002214.
English translation of Kuze, et al., "Development of a Sodium Ion Secondary Battery", R&D Report, "Sumitomo Kagaku", 2013.
Communication dated Jan. 29, 2016 from the Korean Intellectual Property Office in counterpart application No. 10-2011-7002214.
Toray Research Center, Inc., "Evaluation of carbonaceous materials by laser Raman spectroscopy," copyright 2014, available at http://cs2.toray.co.jp/news/trc/news_rd01.nsf/0/53CFF260870512F449257D64001DD586.

* cited by examiner

SODIUM SECONDARY BATTERY COMPRISING CARBONACEOUS MATERIAL

CROSS REFERENCE TO RELATED APPLICATIONS

This application is a National Stage of International Application No. PCT/JP2009/063839, filed on Jul. 29, 2009, which claims priority from Japanese Patent Application No. 2008-195966, filed on Jul. 30, 2008 and Japanese Patent Application No. 2009-073710 filed on Mar. 25, 2009, the contents of all of which are incorporated herein by reference in their entirety.

TECHNICAL FIELD

The present invention relates to a sodium secondary battery.

BACKGROUND ART

A representative secondary battery is a lithium secondary battery. For reduction of carbon dioxide emission, improvement of energy efficiency and utilization of natural energy have been required and in the field of transportation, for example, where internal-combustion engines are considered to be one of the main carbon dioxide emission sources, and in order to minimize the operation of the engines, the utilization of a secondary battery in an electric car, a hybrid car, etc., has been desired. Further, in utilization of natural energy such as wind power generation or solar photovoltaic power generation, there is a problem in temporal fluctuation of power supply and to overcome the problem, the use of a secondary battery as a leveling power source to store surplus power has been desired. As a secondary battery, a large scale secondary battery, which should have a large capacity and be able to be used even after repeated cycles of charge and discharge over a long period, is required. Although a lithium secondary battery has been broadly used as a power source for a cell phone or a notebook PC due to its higher energy density among commercially available batteries, as a very large amount of battery materials are required, if directed to such a large scale secondary battery, there will be a problem of reduction in lithium resources. Since lithium which is a rare metal is used in a large amount therein, the supply of such a rare metal is of concern.

A sodium secondary battery has been studied, which can resolve the supply problem of the battery materials. A sodium secondary battery comprises a positive electrode, into which sodium ions can be doped and dedoped, and a negative electrode, into which sodium ions can be doped and dedoped. A sodium secondary battery can be constituted of materials, which are abundant for supply and low-priced. Consequently, it has been expected that, once it is developed, a large scale secondary battery will become available for supply in large quantities.

While a carbonaceous material with a structure of high degree of graphitization such as graphite has come into practical use as a negative electrode active material in a lithium secondary battery, and application of the carbonaceous material to a negative electrode active material in a sodium secondary battery has been tried. However, being doped and dedoped with sodium ions into such a carbonaceous material are difficult, therefore it is very difficult to use the active material for a lithium secondary battery as is as described above in producing a sodium secondary battery. To overcome this problem, JP11-40156A proposes that lithium ions are injected together with sodium ions into graphite which is a negative electrode active material in a sodium secondary battery.

DISCLOSURE OF INVENTION

Although a carbonaceous material with high degree of graphitization, such as graphite, is used as an active material in the sodium secondary battery disclosed by JP11-40156A, a lithium ion is used together with a sodium ion and therefore an object to stop using a rare metal of lithium cannot be fundamentally achieved. Furthermore, since a sodium ion having a larger ion radius than a lithium ion is partly forced to dope and dedope graphite, the range of interlayer expansion and contraction of graphite is large and the graphite structure becomes brittle with the increase of cycles of charge and discharge, which is unsatisfactory from the standpoint of a cycle property of charge and discharge, and the sodium secondary battery is not sufficiently durable.

The present invention has been carried out in response to such circumstances, with an object of providing a sodium secondary battery with excellent charge and discharge characteristics.

The present inventors have studied intensively on how to solve the problem and have completed the present invention. The present invention provides the following (1) to (19).

(1) A sodium secondary battery comprising a first electrode and a second electrode including a carbonaceous material that satisfies one or more requirements selected from the group consisting of the following requirement 1, requirement 2, requirement 3 and requirement 4:

Requirement 1: an R value (=ID/IG) determined by a Raman spectrometric measurement is 1.07 to 3, wherein, by a "Raman spectrometric measurement", the carbonaceous material is irradiated by laser with wavelength of 532 nm for Raman spectrometric measurement to obtain a Raman spectrum (the vertical axis y represents a scattered light intensity in any optional unit, and the horizontal axis x represents a Raman shift wave number ($cm^{-1}$)), the spectrum having each one peak in a range of 1300 to 1400 $cm^{-1}$ on the horizontal axis and a range of 1570 to 1620 $cm^{-1}$ on the horizontal axis; a fitting function is derived from the spectrum in a wave number range of 600 to 1740 $cm^{-1}$ by fitting with two Lorentz functions and a baseline function; a fitting spectrum is derived by reducing the baseline function therefrom; in the fitting spectrum, the maximum value along the vertical axis in a range of 1300 to 1400 $cm^{-1}$ on the horizontal axis is determined as ID and the maximum value along the vertical axis in a range of 1570 to 1620 $cm^{-1}$ on the horizontal axis is determined as IG; then ID is divided by IG to give the R value (=ID/IG);

Requirement 2: an A value determined by a small-angle X-ray scattering measurement is −0.5 to 0, and a $\sigma_A$ value is 0 to 0.01, wherein by a "small-angle X-ray scattering measurement", the carbonaceous material is examined to obtain a small-angle X-Ray scattering spectrum [the horizontal axis represents a wave number q ($nm^{-1}$), and the vertical axis represents S (=log(I)=common logarithm of scattering intensity I)], and the spectrum in a q range of 0.6 $nm^{-1}$ to 1.8 $nm^{-1}$ is subjected to linear approximation by a least-squares method to obtain a slope of the line (A value) and a standard deviation ($\sigma_A$ value) thereof;

Requirement 3: with respect to an electrode containing an electrode mixture prepared by mixing 85 parts by weight of the carbonaceous material and 15 parts by weight of poly(vinylidene fluoride), pores of not less than 10 nm do not exist substantially in the carbonaceous material in the electrode after being doped and dedoped with sodium ions;

Requirement 4: a $Q_1$ value obtained by a calorimetric differential thermal analysis measurement is 800 Joules/g or less, wherein by a "calorimetric differential thermal analysis measurement", with respect to an electrode containing an electrode mixture prepared by mixing 85 parts by weight of the carbonaceous material and 15 parts by weight of poly(vinylidene fluoride), 1 mg of the electrode mixture in the electrode after sodium ion doping and 8 mg of a nonaqueous electrolyte solution (1 M concentration NaClO$_4$/propylene carbonate) are charged into a well closed container, using $\alpha$-Al$_2$O$_3$ as a reference, a calorimetric differential thermal analysis measurement is conducted at a temperature increase rate of 10° C./min in a range of 40° C. to 410° C. to obtain a total amount of generated heat $Q_1$ value based on 1 g of the electrode mixture and the nonaqueous electrolyte solution in a range of 100° C. to 400° C.

(2) The sodium secondary battery according to (1), wherein the carbonaceous material satisfies the requirement 1.

(3) The sodium secondary battery according to (1) or (2), wherein the carbonaceous material is yielded by carbonization of an organic material having an aromatic ring.

(4) The sodium secondary battery according to (3), wherein the organic material having an aromatic ring is yielded by polymerization of phenol or a derivative thereof and an aldehyde compound.

(5) The sodium secondary battery according to (1) or (2), wherein the carbonaceous material is yielded by carbonization of an organic plant material.

(6) The sodium secondary battery according to (5), wherein the carbonaceous material is charcoal.

(7) The sodium secondary battery according to (1) or (2), wherein the carbonaceous material is yielded by carbonization of plant residual oil.

(8) The sodium secondary battery according to (7), wherein the plant residual oil is a residual oil obtained in production of resorcinol.

(9) The sodium secondary battery according to any one of (3) to (8), wherein the temperature for the carbonization is a temperature of from 800° C. to 2500° C.

(10) The sodium secondary battery according to any one of (1) to (9), wherein the carbonaceous material is not yet activated.

(11) The sodium secondary battery according to any one of (1) to (10), wherein the carbonaceous material is in a powder form and the BET specific surface area thereof is 1 m$^2$/g or higher.

(12) The sodium secondary battery according to any one of (1) to (11), wherein the first electrode is a positive electrode and the second electrode is a negative electrode.

(13) The sodium secondary battery according to any one of (1) to (12), wherein a separator is placed between the first electrode and the second electrode.

(14) The sodium secondary battery according to (13), wherein the separator comprises a laminated film combining a heat-resistant porous layer and a porous film.

(15) The sodium secondary battery according to any one of (1) to (14), wherein the second electrode comprises a non-fluorinated polymer.

(16) A screening process for a carbonaceous material for a sodium secondary battery, comprising a step for conducting a Raman spectrometric measurement of a carbonaceous material, and a step for screening a carbonaceous material by comparing an R value (=ID/IG) to be obtained with a discriminant range of 1.07 to 3, wherein, by a "Raman spectrometric measurement", the carbonaceous material is irradiated by laser with wavelength of 532 nm for Raman spectrometric measurement to obtain a Raman spectrum (the vertical axis y represents a scattered light intensity in any optional unit, and the horizontal axis x represents a Raman shift wave number (cm$^{-1}$)), the spectrum having each one peak in a range of 1300 to 1400 cm$^{-1}$ on the horizontal axis and a range of 1570 to 1620 cm$^{-1}$ on the horizontal axis; a fitting function is derived from the spectrum in a wave number range of 600 to 1740 cm$^{-1}$ by fitting with two Lorentz functions and a baseline function; a fitting spectrum is derived by reducing the baseline function therefrom; in the fitting spectrum, the maximum value along the vertical axis in a range of 1300 to 1400 cm$^{-1}$ on the horizontal axis is determined as ID and the maximum value along the vertical axis in a range of 1570 to 1620 cm$^{-1}$ on the horizontal axis is determined as IG; then ID is divided by IG to give the R value (=ID/IG).

(17) A screening process for a carbonaceous material for a sodium secondary battery, comprising a step for conducting a small-angle X-Ray scattering measurement of a carbonaceous material, and a step for screening a carbonaceous material by comparing an A value and a $\sigma_A$ value to be obtained with a discriminant range of −0.5 to 0 and a discriminant range of 0 to 0.010 respectively, wherein by a "small-angle X-Ray scattering measurement", the carbonaceous material is examined to obtain a small-angle X-Ray scattering spectrum [the horizontal axis represents a wave number q (nm$^{-1}$), and the vertical axis represents S (=log(I))=common logarithm of scattering intensity I)], and the spectrum in a q range of 0.6 nm$^{-1}$ to 1.8 nm$^{-1}$ is subjected to linear approximation by a least-squares method to obtain a slope of the line (A value) and a standard deviation ($\sigma_A$ value) thereof.

(18) A screening process for a carbonaceous material for a sodium secondary battery, comprising a step for preparing an electrode mixture by mixing 85 parts by weight of a carbonaceous material and 15 parts by weight of poly(vinylidene fluoride), a step for preparing an electrode using the electrode mixture, a step for doping sodium ions into the electrode followed by dedoping sodium ions from the electrode, a step for observing the carbonaceous material in the electrode, and a step for screening the carbonaceous material by comparing the image observed with a discriminant criteria that pores of not less than 10 nm do not substantially exist.

(19) A screening process for a carbonaceous material for a sodium secondary battery, comprising a step for conducting a calorimetric differential thermal analysis measurement of a carbonaceous material, and a step for screening a carbonaceous material by comparing a $Q_1$ value to be obtained with a discriminant range of 800 Joules/g or less, wherein by a "calorimetric differential thermal analysis measurement", with respect to an electrode containing an electrode mixture prepared by mixing 85 parts by weight of the carbonaceous material and 15 parts by weight of poly(vinylidene fluoride), 1 mg of the electrode mixture in the electrode after sodium ion doping and 8 mg of a nonaqueous electrolyte solution (1 M concentration NaClO$_4$/propylene carbonate) are charged into a well closed container, using $\alpha$-Al$_2$O$_3$ as a reference, a calorimetric differential thermal analysis measurement is conducted at a temperature increase rate of 10° C./min in a range of 40° C. to 410° C. to obtain a total amount of generated heat $Q_1$ based on 1 g of the electrode mixture and the nonaqueous electrolyte solution in a range of 100° C. to 400° C.

DESCRIPTION OF SYMBOLS

Figure 1:
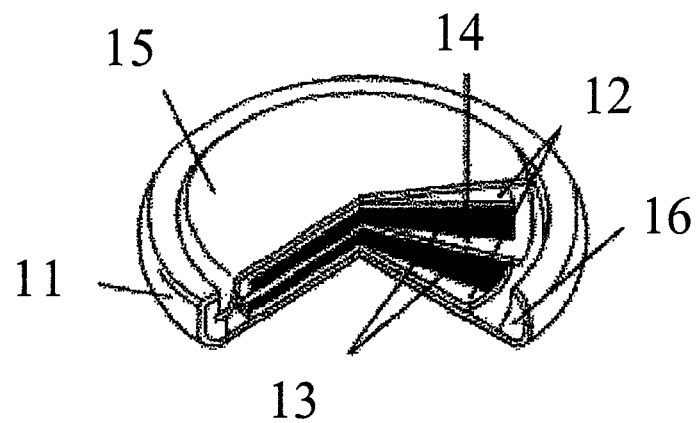
FIG. 1 shows an example (schematic view) of a coin-shaped sodium secondary battery.

11: Metallic container
12: Current collector
13: Electrode material
14: Separator
15: Metallic lid
16: Gasket
21: Metallic container
22: Current collector
23: Electrode material
24: Separator
25: Electrode sealing plate
26: Lead
Made for Carrying out the Invention
Carbonaceous Material A carbonaceous material according to the present invention is good for efficient doping and dedoping of sodium ions for a sodium secondary battery, and a sodium secondary battery using the carbonaceous material as an electrode of a secondary battery can be charged and discharged at a high charge and discharge capacity, and further the discharge capacity decreases little, even if a charge and discharge cycle is repeated many times.

Firstly, requirement 1 will be described.

A carbonaceous material should preferably satisfy requirement 1. Namely, a carbonaceous material, whose R value obtained from a Raman spectrometric measurement in the requirement 1 is 1.07 to 3, can be doped and dedoped efficiently with sodium ions in a sodium secondary battery. A sodium secondary battery using the carbonaceous material as an electrode of the secondary battery can be charged and discharged at a higher charge and discharge capacity, and further the discharge capacity decreases little, even if the charge and discharge cycle is repeated many times.

A Raman spectrum can be obtained, for example, by measurement by a microscopic Raman spectrometer (Model NRS-1000 by JASCO Corporation) using laser irradiating light of wavelength 532 nm, power 5 mW, a single spectrometer and an electronic cooling CCD detector, at an irradiation time of 15 sec and a number of averaging scans 10. The Raman spectrometric measurement may be conducted on a carbonaceous material itself or on an electrode with the carbonaceous material. In the latter case, a recommendable process for preparing an electrode is: to weigh a carbonaceous material and polyvinylidene-fluoride (PVDF) at a weight ratio of 85:15, to disperse them in N-methyl-2-pyrrolidone (NMP), and to apply the obtained slurry onto a copper foil up to 0.1 mm thick, which is then dried in vacuum at 150° C. In case the Raman spectrometric measurement is conducted on an electrode, the electrode surface with the coat of a carbonaceous material is irradiated by laser.

The carbonaceous material is irradiated by laser with wavelength of 532 nm for Raman spectroscopic measurement to obtain a Raman spectrum (the vertical axis y represents a scattered light intensity in any optional unit, and the horizontal axis x represents a Raman shift wave number ($cm^{-1}$)). The spectrum has each one peak in a range of 1300 to 1400 $cm^{-1}$ on the horizontal axis and a range of 1570 to 1620 $cm^{-1}$ on the horizontal axis. From the spectrum, R value (=ID/IG) can be obtained as follows.

(1) The following formula is used for two Lorentz functions and a baseline function.

$$y=[A_1/\{(x-x_1)^2+B_1^2\}]+[A_2/\{(x-x_2)^2+B_2^2\}]+[C_1x^3+C_2x^2+C_3x+C_4]$$

wherein $A_1$, $B_1$, and $x_1$ are parameters relating to the peak in the horizontal axis range of 1300 to 1400 $cm^{-1}$, and $x_1$ is the Raman shift wave number at the peak maximum value. $A_2$, $B_2$, and $x_2$ are parameters relating to the peak in the horizontal axis range of 1570 to 1620 $cm^{-1}$, and $x_2$ is the Raman shift wave number at the peak maximum value. A third-degree polynomial $C_1x^3+C_2x^2+C_3x+C_4$ in the above formula is a baseline function, and $A_1/\{(x-x_1)^2+B_1^2\}$ and $A_2/\{(x-x_2)^2+B_2^2\}$ are Lorentz functions.

(2) With respect to the Raman spectrum in a wave number range of 600 to 1740 $cm^{-1}$, using data points (x, y) in a number of 1,000 or more, optimum values of $A_1$, $B_1$, $x_1$, $A_2$, $B_2$, $x_2$, $C_1$, $C_2$, $C_3$, and $C_4$ are determined for fitting by a least-squares method, and a fitting function is obtained by substituting the optimum values of $A_1$, $B_1$, $x_1$, $A_2$, $B_2$, $x_2$, $C_1$, $C_2$, $C_3$, and $C_4$ in the above formula.

(3) A fitting spectrum is obtained by reducing the baseline function from the fitting function. Such fitting spectrum is expressed by $y=[A_1/\{(x-x_1)^2+B_1^2\}]+[A_2/\{(x-x_2)^2+B_2^2\}]$.

(4) With respect to the fitting spectrum the maximum value along the vertical axis in a range of 1300 to 1400 $cm^{-1}$ on the horizontal axis is determined as ID and the maximum value along the vertical axis in a range of 1570 to 1620 $cm^{-1}$ on the horizontal axis is determined as IG; then ID is divided by IG to give the R value (=Meanwhile, the R value equals to the value of $A_1/A_2$.

With respect to the fitting spectrum, $(A_1 \times B_2)/(B_1 \times A_2)$ may be hereinafter occasionally referred to as a NR value and is also a valuable parameter, which is derived by dividing $(A_1/B_1)$ by $(A_2/B_2)$, while $A_1/B_1$ and $A_2/B_2$ are calculated by dividing a peak maximum intensity by the half width at half maximum of the peak. The value $B_1$ of the fitting spectrum is also a useful parameter.

For fitting a software, such as IGOR Pro (trade name) by WaveMetrics Inc., may be applicable.

In order to realize a higher charge-discharge capacity of a sodium secondary battery, the R value is preferably 1.10 to 3, and more preferably 1.3 to 3.

In order to realize a higher charge-discharge capacity of a sodium secondary battery, the $B_1$ value of the fitting spectrum is preferably in a range of 25 $cm^{-1}$ to 100 $cm^{-1}$.

Further, in order to realize a higher charge-discharge capacity of a sodium secondary battery, the NR value of the fitting spectrum is preferably 0.62 or higher.

The aforedescribed Raman spectrometric measurement is valuable for screening a carbonaceous material for a sodium secondary battery. A screening process for a carbonaceous material for a sodium secondary battery by a Raman spectrometric measurement includes, for example, a step for conducting a Raman spectrometric measurement on a carbonaceous material, and a step for screening the carbonaceous material by comparing an R value (=ID/IG) with the discriminant range of 1.07 to 3.

Next, requirement 2 will be described.

A small-angle X-ray scattering measurement may be conducted with a small-angle X-ray scattering apparatus equipped with a two-dimensional detector. As the apparatus, NANOSTAR (trade name) by Bruker AXS may be exemplified. A specific example of the measurement will be described below. A carbonaceous material is filled in a 1 mm-inner diameter quartz capillary, and a rotating anticathode X-ray generator with a Cu target is used. The quartz capillary filled with a carbonaceous material is irradiated by X-rays generated at 50 kV and 100 mA. X-rays radiate through an X-ray optical system composed of a cross coupled Goebel Mirror and 3 pinhole slits (with hole sizes of 500 μmΦ, 150 μmΦ, and 500 μmΦ from the X-ray generator side), and further through the quartz capillary to hit the carbonaceous material. X-rays hit the carbonaceous material and scattered by the carbonaceous material are detected by a two-dimensional detector (a two-dimensional multi-wire detector, Hi-STAR). The camera length between a sample and the detector is for example 106 cm, and a size of a direct-beam stopper is for example 2 mmΦ. The degree of vacuum inside the apparatus is for example 40 Pa or less. Calibration of a scattering angle $2\theta$ and a direct-beam position is carried out using for example the respective peaks of the first order ($2\theta=1.513°$) and the second order ($2\theta=3.027°$) of silver behenate. In this case, a range of a measurable scattering angle $2\theta$ is 0.08 to 3°. A detected two-dimensional scattering image is analyzed according to a conventional method using an analysis software (SAXS Ver. 4.1.29 by Bruker AXS) to obtain a small-angle X-ray scattering spectrum [the horizontal axis: wave number q (nm$^{-1}$), and the vertical axis: S (=log(I)=common logarithm of scattering intensity I]. As a blank test, a quartz capillary without a carbonaceous material is measured similarly as above. In case the S value of a small-angle X-ray scattering spectrum at q=0.6 nm$^{-1}$ for a quartz capillary filled with a carbonaceous material is 10-times or more higher than that of the blank test, the small-angle X-ray scattering spectrum is deemed to be reliable. The A value or the standard deviation $\sigma_A$ value thereof can be obtained through linear approximation by a least-squares method from a small-angle X-ray scattering spectrum in the q range of 0.6 nm$^{-1}$ to 1.8 nm$^{-1}$ using, for example, a software IGOR Pro (trade name) by WaveMetrics Inc. The linear approximation may be carried out by dividing the q range at even intervals into 100 or more segments to obtain higher accuracy values.

The aforedescribed small-angle X-ray scattering measurement is valuable as a process for screening a carbonaceous material for a sodium secondary battery. A screening process for a carbonaceous material for a sodium secondary battery by a small-angle X-ray scattering measurement includes, for example, a step for conducting a small-angle X-ray scattering measurement on a carbonaceous material, and a step for screening the carbonaceous material by comparing an A value and a $\sigma_A$ value obtained with the respective discriminant ranges of −0.5 to 0, and 0 to 0.010.

A carbonaceous material preferably satisfies requirement 1 and requirement 2.

Next, requirement 3 will be described.

It is possible to determine by observing an image by a transmission electron microscope (TEM) that pores of not less than 10 nm do not exist substantially in a carbonaceous material. Such determination can also be conducted by a scanning transmission electron microscope (STEM). Doping and dedoping of sodium ions are carried out specifically as follows. An electrode that is prepared by mixing 85 parts by weight of a carbonaceous material and 15 parts by weight of poly(vinylidene fluoride) is used as the second electrode and as the first electrode, for example, a sodium metal is used to construct a battery. By allowing a current to flow from the second electrode to the first electrode, the second electrode is doped with sodium ions. In that case, constant current of 10 mA per 1 g of the carbonaceous material should continue to flow until reaching 0.005 V. Dedoping of sodium ions from the second electrode doped with sodium ions is carried out by applying current from the first electrode to the second electrode. In that case, a constant current of 10 mA per 1 g of the carbonaceous material should continue to flow until reaching 1.5 V. After dedoping the battery is disassembled in an inert atmosphere, as in a dry Ar or nitrogen, the second electrode is taken out, washed with dimethyl carbonate (hereinafter occasionally referred to as DMC), and dried in vacuum, and then the electrode mixture is recovered. Using the recovered electrode mixture, a particle constituting the carbonaceous material is sectioned by a focused ion beam processing equipment (hereinafter occasionally referred to as FIB) to a slice with a uniform thickness in a range 100 nm to 200 nm. By observing the image of the slice at an acceleration voltage of 200 kV, whether pores of not less than 10 nm do not exist substantially in the carbonaceous material can be determined. Observation of a bright-field image is preferable. Transportation of a sample among the respective processing steps is preferably conducted in an inert atmosphere. The pores in a carbonaceous material may be inside the carbonaceous material or at surface thereof, which can be distinguished by the aforedescribed observation of an image.

According to the aforedescribed process, including, for example, a step for preparing an electrode mixture by mixing 85 parts by weight of a carbonaceous material and 15 parts by weight of poly(vinylidene fluoride), a step for preparing an electrode using the electrode mixture, a step for doping sodium ions into the electrode followed by dedoping sodium ions from the electrode, a step for observing the carbonaceous material in the electrode, and a step for screening the carbonaceous material by comparing the image observed with a discriminant criteria that pores of not less than 10 nm do not exist substantially, a carbonaceous material for a sodium secondary battery with excellent charge and discharge characteristics can be screened.

A carbonaceous material preferably satisfies requirement 1 and requirement 3, and more preferably satisfies requirement 1, requirement 2 and requirement 3.

Next, requirement 4 will be described.

A calorimetric differential thermal analysis measurement is conducted with a calorimetric differential thermal analysis apparatus. As such an apparatus DSC200 (trade name) by Seiko Instruments Inc. may be exemplified. Doping of sodium ions is carried out specifically as follows. An electrode that is prepared by mixing 85 parts by weight of a carbonaceous material and 15 parts by weight of poly (vinylidene fluoride) is used as the second electrode and as the first electrode, for example, a sodium metal is used to construct a battery. By allowing a current to flow from the second electrode to the first electrode, the second electrode is doped with sodium ions. In that case, constant current of 10 mA per 1 g of the carbonaceous material should continue to flow until reaching 0.005 V. After doping the battery is disassembled in an inert atmosphere as in a dry Ar, the second electrode is taken out, washed with dimethyl carbonate (hereinafter occasionally referred to as DMC), and dried in vacuum, and then the electrode mixture is recovered. The electrode mixture is doped by sodium ions. Then 1 mg of the recovered electrode mixture and 8 mg (2 μL by volume) of a nonaqueous electrolyte solution (1 M concentration $NaClO_4$/propylene carbonate) are filled in an inert atmosphere as dry Ar into a well closable container for a calorimetric differential thermal analysis measurement, which is closed with a lid and caulked tightly. Using $\alpha$-$Al_2O_3$ as a reference, a calorimetric differential thermal analysis measurement is conducted at a temperature increase rate of 10° C./min in a range of 40° C. to 410° C. to obtain a total amount of generated heat $Q_1$ based on 1 g of the electrode mixture and the nonaqueous electrolyte solution in a range of 100° C. to 400° C. The $Q_1$ value can be determined from an endothermic-exothermic spectrum (horizontal axis: heat flow (unit: mW), vertical axis: temperature (unit: ° C.)) obtained by a calorimetric differential thermal analysis measurement.

According to requirement 4, the $Q_1$ value is 800 Joules/g or less. To strengthen the advantage of the present invention, a total amount of generated heat $Q_2$ based on 1 g of the electrode mixture and the nonaqueous electrolyte solution in a range of 100° C. to 200° C. according to a calorimetric differential thermal analysis measurement is preferably 50 Joules/g or less. Further, a total amount of absorbed heat $Q_3$ based on 1 g of the electrode mixture and the nonaqueous electrolyte solution in a range of 90° C. to 100° C. according to a calorimetric differential thermal analysis measurement is preferably 0.5 Joules/g or less, and a more preferable $Q_3$ value is 0.2 Joules/g or less. Such a carbonaceous material can suppress better precipitation of a sodium metal. The $Q_2$ value and the Q3 value can be determined from an endothermic-exothermic spectrum (horizontal axis: heat flow (unit: mW), vertical axis: temperature (unit: ° C.)) obtained by a calorimetric differential thermal analysis measurement.

The aforedescribed calorimetric differential thermal analysis measurement is valuable for a process for screening a carbonaceous material for a sodium secondary battery. A process for screening a carbonaceous material for a sodium secondary battery using a calorimetric differential thermal analysis measurement includes, for example, a step for conducting a calorimetric differential thermal analysis measurement for a carbonaceous material, and a step for screening the carbonaceous material by comparing the obtained $Q_1$ value with the discriminant range of 800 Joules/g or less.

A carbonaceous material preferably satisfies requirement 1 and requirement 4, more preferably satisfies requirement 1, requirement 2 and requirement 4, and further preferably satisfies requirement 1, requirement 2, requirement 3 and requirement 4.

A carbonaceous material is generally in a powder form and the BET specific surface area thereof is 1 $m^2$/g or higher. Such a carbonaceous material has good wettability of an electrolyte solution, requires shorter immersion time during assembly of a battery, and therefore advantageous to production of a battery. The upper limit of the BET specific surface area is usually 700 $m^2$/g. The BET specific surface area can be calculated from a nitrogen adsorption isotherm measured at the liquid nitrogen temperature, and as a measurement apparatus AUTOSORB (by Yuasa Ionics Inc.) can be exemplified.

A carbonaceous material is generally in a powder form and the mean particle size of component particles is usually 50 μm or less, preferably 30 μm or less, and more preferably 10 μm or less. Owing to fine particle size of a carbonaceous material, the packing density of an electrode can be increased, so that the internal resistance can be decreased. The mean particle size signifies a volume mean particle size (diameter), which is measured by a laser diffraction particle size distribution analyzer (for example SALD2000J (registered trademark), by Shimadzu Corporation)) after dispersing a carbonaceous material in an aqueous solution containing a neutral detergent.

In order to improve the charge-discharge capacity of a sodium secondary battery, the atomic ratio of hydrogen to carbon (H/C) of a carbonaceous material is preferably 0.2 or less.

As a preferred carbonaceous material, carbon microbeads can be exemplified, such as Nicabeads ICB (trade name) by Nippon Carbon Co., Ltd. While mesocarbon microbeads (MCMB) can not satisfy the R value requirement, and is therefore not preferable. Further, from a standpoint of increasing the charge-discharge capacity of a sodium secondary battery, a carbonaceous material is preferably not glassy carbon.

Production Process for Carbonaceous Material

As a carbonaceous material, any carbonaceous materials prepared by carbonization of various organic materials, that can satisfy any of the respective requirements, such that the R value should be 1.07 to 3 (requirement 1), may be utilized. Examples of an organic material include natural mineral resources, such as petroleum and coal; various synthetic resins (thermosetting resins, thermoplastic resins, etc.) synthesized from the resources; various chemical plant residual oils, such as petroleum pitch, coal pitch, and pitch for spinning; and an organic material originated from a plant such as wood, which may be used singly or in a combination of two or more.

Examples of a synthetic resin include a phenol resin, a resorcinol resin, a furan resin, an epoxy resin, a urethane resin, an unsaturated polyester resin, a melamine resin, a urea resin, an aniline resin, a bismaleimide resin, a benzoxazine resin, a polyacrylonitrile resin, a polystyrene resin, a polyamide resin, a cyanate resin, and a ketone resin, which may be used singly or in a combination of two or more. A synthetic resin may contain a curing agent or an additive for practical use. There is no particular restriction on a curing method, and in case a phenol resin is used, heat curing, thermal oxidation, epoxy curing, and isocyanate curing can be exemplified. In case an epoxy resin is used, phenol resin curing, acid anhydride curing, amine curing, or the like can be used.

Among organic materials, an organic material with an aromatic ring is preferable. Using such an organic material, a carbonaceous material can be obtained at a high yield, an environmental load can be minimized, and production costs can be also reduced.

Examples of an organic material with an aromatic ring include a phenol resin (a novolac-type phenolic resin, a resol-type phenolic resin, etc.), an epoxy resin (a bisphenol-type epoxy resin, a novolac-type epoxy resin, etc.), an aniline resin, a bismaleimide resin, and a benzoxazine resin, which may be used singly or in a combination of two or more. Such an organic material may contain a curing agent or an additive.

As an organic material with an aromatic ring, an organic material yielded by polymerizing phenol or a derivative thereof and an aldehyde compound is preferred. Since such an organic material is inexpensive among organic materials with an aromatic ring, and produced industrially in a large volume, a carbonaceous material yielded by carbonization of the same can be used favorable.

An example of an organic material yielded by polymerizing phenol or a derivative thereof and an aldehyde compound, a phenol resin can be exemplified. Since a phenol resin is inexpensive and produced industrially in a large volume, it constitutes a favorable source material for a carbonaceous material. In case a carbonaceous material yielded by carbonizing a phenol resin is used for an electrode of a sodium secondary battery, especially for a negative electrode, the charge-discharge capacity and the discharge capacity after repeated charge and discharge cycles of the secondary battery are extraordinarily large. The reason thereof is not clear, but it is presumed that a phenol resin holds a well developed three-dimensional cross-linked structure, and a carbonaceous material yielded by carbonizing the resin retains the well developed three-dimensional cross-linked structure originated from the resin, the structure being a cause of the large discharge capacity.

Examples of phenol or a derivative thereof include phenol, o-cresol, m-cresol, p-cresol, catechol, resorcinol, hydroquinone, xylenol, pyrogallol, bisphenol A, bisphenol F, p-phenylphenol, p-tert-butylphenol, p-tert-octylphenol, α-naphthol, and β-naphthol, which may be used singly or in a combination of two or more.

Examples of an aldehyde compound include formaldehyde, paraformaldehyde, trioxane, acetaldehyde, propionaldehyde, polyoxymethylene, chloral, furfural, glyoxal, n-butylaldehyde, caproaldehyde, allylaldehyde, benzaldehyde, crotonaldehyde, acrolein, tetraoxymethylene, phenylacetaldehyde, o-tolualdehyde, and salicylaldehyde, which may be used singly or in a combination of two or more.

There is no particular restriction on a phenol resin, and a resol-type phenolic resin, or a novolac-type phenolic resin can be utilized. A resol-type phenolic resin can be yielded by polymerizing phenol or a derivative thereof and an aldehyde compound in the presence of a basic catalyst. A novolac-type phenolic resin can be yielded by polymerizing phenol or a derivative thereof and an aldehyde compound in the presence of an acidic catalyst.

In case a self-curing resol-type phenolic resin is used, an acid or a curing agent may be added to a resol-type phenolic resin, or a novolac-type phenolic resin may be added to decrease the degree of curing. A combination thereof may be also added.

As a novolac-type phenolic resin, a type called as a random novolac, which has methylene groups bonded equally at o-position and p-position, and a type called as a high-ortho novolac, which has more methylene groups bonded at o-position are known. A random novolac can be yielded by a process for subjecting phenol or a derivative thereof and an aldehyde compound to a condensation reaction under a normal pressure at 100° C. for several hours with a catalyst of a known organic and/or inorganic acid, followed by dehydration and removal of unreacted monomers. A high-ortho novolac can be yielded by a process for subjecting phenol or a derivative thereof and an aldehyde compound to an addition condensation reaction under a weak acidic condition with a metallic salt catalyst, such as zinc acetate, lead acetate, and zinc naphthenate, then continuing a condensation reaction under dehydration directly or with further addition of an acidic catalyst, optionally followed by removal of unreacted monomers.

As a phenol resin can be used commercially available products, and examples thereof include:

a powder form phenol resin, such as Resitop (trade name, by Gunei Chemical Ind., Co. Ltd.) PGA-4528, PGA-2473, PGA-4704, PGA-4504; Sumiliteresin (trade name, by Sumitomo Bakelite Co., Ltd.) PR-UFC-504, PR-EPN, PR-ACS-100, PR-ACS-150, PR-12687, PR-13355, PR-16382, PR-217, PR-310, PR-311, PR-50064, PR-50099, PR-50102, PR-50252, PR-50395, PR-50590, PR-50590B, PR-50699, PR-50869, PR-51316, PR-51326B, PR-51350B, PR-51510, PR-51541B, PR-51794, PR-51820, PR-51939, PR-53153, PR-53364, PR-53497, PR-53724, PR-53769, PR-53804, PR-54364, PR-54458A, PR-54545, PR-55170, PR-8000, PR-FTZ-1, and PR-FTZ-15);

a liquid form phenol resin, such as PR-51947A, PR-53123, PR-53338, PR-53717, PR-54135, PR54313, and PR54562;

a flake-form phenol resin, such as Sumiliteresin (trade name, by Sumitomo Bakelite Co., Ltd.) PR-12686R, PR-13349, PR-50235A, PR-51363F, PR-51494G, PR-51618G, PR-53194, PR-53195, PR-54869, PR-F-110, PR-F-143, PR-F-151F, PR-F-85G, PR-HF-3, and PR-HF-6;

a liquid form phenol resin, such as Sumiliteresin (trade name, by Sumitomo Bakelite Co., Ltd.) PR-50087, PR-50607B, PR-50702, PR-50781, PR-51138C, PR-51206, PR-51663, PR-51947A, PR-53123, PR-53338, PR-53365, PR-53717, PR-54135, PR-54313, PR-54562, PR-55345, PR-940, PR-9400, PR-967;

a novolac-type liquid form phenolic resin, such as Sumiliteresin (trade name, by Sumitomo Bakelite Co., Ltd.) PR-51629, PR-53093, PR-53473, PR-53522, PR-53546, PR-53800, PR-54438, PR-54540C, and PR-55438;

a resol-type liquid form phenolic resin, such as Resitop (trade name, by Gunei Chemical Ind., Co. Ltd.) PL-4826, PL-2390, PL-4690, PL-3630, PL-4222, PL-4246, PL-2211, PL-3224, PL-4329; Sumiliteresin (trade name, by Sumitomo Bakelite Co., Ltd.) PR-50273, PR-51206, PR-51781, PR-53056, PR-53311, PR-53416, PR-53570, and PR-54387;

a fine-particle phenol resin, such as Bellpearl (trade name, by Air Water Inc.) R800, R700, R600, R200, R100, S830, S870, S890, 5895, S290, and S190; and a spherical phenol resin Maririn (Japanese trade name, by Gunei Chemical Ind., Co. Ltd.) GU-200, FM-010, FM-150, HF-008, HF-015, HF-075, HF-300, HF-500, and HF-1500;

a solid phenol resin, such as Resitop (trade name, by Gunei Chemical Ind., Co. Ltd.) PS-2601, PS-2607, PS-2655, PS-2768, PS-2608, PS-4609, PSM-2222, PSK-2320, and PS-6132.

As an organic material having an aromatic ring in its molecular structure, various further organic materials can be utilized. They are not limited to synthetic resins as described above, and any organic materials that can be converted to a carbonaceous material by carbonization may be utilized.

A synthetic resin is generally characterized in that monomers are polymerized to a macromolecule, however, as an organic material with an aromatic ring according to the present invention, an organic material synthesized by polymerizing several to several tens of monomers can be also utilized.

When phenol or a derivative thereof and an aldehyde compound are polymerized, a byproduct may be formed or an unreacted monomer may remain, but such a byproduct or unreacted monomer may also be utilized as an organic material, so that the waste and therefore the load on the environment can be reduced, and a carbonaceous material can be made available at a reduced cost.

Further, by using a carbonaceous material yielded by carbonizing an organic material originated from a plant as a carbonaceous material, the load on the environment can be reduced.

As an example of the organic material originated from a plant, wood may be named, and charcoal yielded by carbonation of the same is preferred as an organic material. As wood, scrap wood, waste wood rejected from a wood processing mill such as sawdust, lumber from forest-thinning, etc., can be utilized. As constituents of wood, cellulose, hemicellulose and lignin can be named generally as three main constituents, and lignin is preferred because it is an organic material with an aromatic ring.

Examples of wood include gymnosperm, such as *Cycadopsida, Ginkgopsida, Coniferopsida* (Japanese cedar, Japanese cypress, Japanese red pine, etc.), and *Chlamydospermopsida*; and angiosperm, such as broad-leaved trees (*Quercus crispula*, beech, poplar, *Ulmus davidiana, Quercus*, etc.), a herbaceous plant, *Palmae*, and a bamboo.

Among various types of wood, Japanese cedar is used broadly as a building material and sawdust of the same rejected from a processing mill is preferred to produce a carbonaceous material, because the load on the environment and the production cost can be reduced. Further, bincho charcoal, produce by carbonizing Quercus is preferable also as a carbonaceous material.

Meanwhile, by utilization of a carbonaceous material yielded by carbonization of a chemical plant residual oil as a carbonaceous material, resources can be used up effectively.

Examples of a chemical plant residual oil include various residual oils from the production of various petrochemical products such as ethylene. More specifically are included a distillation residual oil, a fluid catalytic cracking residual oil, a hydrodesulfurized oil therefrom, and a petroleum heavy oil containing a mixed oil thereof. Among others, a residual oil from the production of a petrochemical product with an aromatic ring is preferable, and a residual oil from the production of resorcinol can be named as a specific example.

A residual oil from the production of resorcinol becomes available, for example, as follows. A liquid composition containing alkyl aromatic hydrocarbons is oxidized to a liquid composition containing aromatic hydroperoxides, this liquid composition is brought into contact with an aqueous alkali solution, and the aromatic hydroperoxides are extracted into the oil phase. The obtained oil phase is brought into contact with an acid to decompose the aromatic hydroperoxides by acid to convert to an oil phase containing resorcinol, which is then separated to a low-boiling fraction containing an organic solvent, and resorcinol, and tar to obtain tar. The tar can be used as a residual oil from the production of resorcinol and the tar is preferred as a source material for a carbonaceous material.

A carbonaceous material can be yielded by carbonizing a single or two or more of the aforedescribed various organic materials. As for the carbonization temperature, a preferable carbonization temperature is a temperature of 800° C. to 2500° C., and the carbonization is preferably carried out in an inert gas atmosphere. An organic material may be carbonized as it is, or a calcined product yielded by heating an organic material at 400° C. or below in the presence of an oxidizing gas may be carbonized in an inert gas atmosphere. Examples of an inert gas include nitrogen and argon, and examples of an oxidizing gas include air, $H_2O$, $CO_2$, and $O_2$. The carbonization may be conducted under a reduced pressure. For the heating and carbonization, such a facility as a rotary kiln, a roller hearth kiln, a pusher kiln, a multistage furnace, and a fluidized bed furnace may be used. A rotary kiln is for universal use.

A carbonaceous material may be either activated or unactivated, but is preferably unactivated. Activation means that a carbonaceous material yielded by carbonization is further calcined in the presence of an oxidizing gas at a temperature of 200° C. to 1500° C.

A carbonaceous material may be in a fractured form. Fracturing may be conducted by a pulverizing mill, such as an impact-attrition mill, a centrifugal mill, a ball mill (a tube mill, a compound mill, a conical ball mill, and a rod mill), a vibration mill, a colloid mill, a disk attrition mill and a jet mill, and preferably conducted by a ball mill. In fracturing, contamination of a metallic powder should be better avoided, and surfaces of the mills contacting a carbonaceous material should preferably use a nonmetal material such as alumina and agate.

Sodium Secondary Battery

A sodium secondary battery according to the present invention includes a first electrode and a second electrode having the aforedescribed carbonaceous material. A sodium secondary battery includes usually a first electrode, a second electrode, an electrolyte, and a separator.

In case a first electrode contains a sodium metal or a sodium alloy, the first electrode functions as a negative electrode and the second electrode as a positive electrode. In case a first electrode contains an inorganic sodium compound, to/from which sodium ions can be doped and dedoped, the first electrode functions as a positive electrode, and the second electrode as a negative electrode.

A sodium secondary battery is usually manufactured by placing an electrode assembly prepared by laminating or winding a negative electrode, a separator and a positive electrode, into a container such as a battery can, and then impregnating an electrolyte solution containing an electrolyte. The form of a sodium secondary battery is determined according to the form of a container, and examples thereof include coin-shaped, cylindrical and square-shaped.

A Second Electrode

A second electrode is constituted, for example, of a carbonaceous material as described above and an electrode mixture containing a binder, according to need, a conductive additive, etc., which are supported by a current collector, and is usually in a sheet form. Examples of a process for producing a second electrode include (1) a process, by which an electrode mixture is prepared by adding a solvent to a carbonaceous material, a binder, a conductive additive, etc., a current collector is coated therewith by a doctor blade method, etc., or is immersed therein, and then the same is dried; (2) a process, by which a sheet is prepared by adding a solvent to a carbonaceous material, a binder, a conductive additive, etc., kneading the mixture, forming and drying, the sheet is combined onto a surface of a current collector by means of a conductive adhesive, etc. followed by pressing, heat-treating and drying; and (3) a process, by which a mixture of a carbonaceous material, a binder, a conductive additive, a liquid lubricant, etc. is cast on a current collector, the liquid lubricant is removed, and then a resulted sheet-like formation is stretched mono- or multi-axially. In case the electrode is in a sheet form, the thickness thereof is usually about 5 to 500 μm.

Examples of a material for a current collector of a second electrode include a metal, such as nickel, aluminium, titanium, copper, gold, silver, platinum, an aluminium alloy and a stainless steel; those formed by plasma spraying or arc spraying of, for example, a carbonaceous material, an activated carbon fiber nickel, aluminium, zinc, copper, tin, lead, or an alloy thereof, and a conductive film of a polymer, such as rubber and a styrene-ethylene-butylene-styrene copolymer (SEBS) dispersed with a conductive additive. In particular, copper is preferable, because it is not apt to alloy with sodium and is easy to form a thin foil. Examples of a form of a current collector include a foil, a lamina, a mesh, a net, a lath, a punched or embossed form, and a combination thereof (for example, a meshed lamina). A surface of a current collector may be roughened by etching.

As an example of a binder, a polymer of a fluorine compound may be named. Examples of a fluorine compound include a C1-C18 fluorinated alkyl (meth)acrylate, a perfluoroalkyl (meth)acrylate, [such as perfluorododecyl (meth)acrylate, perfluoro-n-octyl (meth)acrylate, and perfluoro-n-butyl (meth)acrylate], a perfluoroalkyl-substituted-alkyl (meth)acrylate, [such as perfluorohexylethyl (meth)acrylate, and perfluorooctylethyl (meth)acrylate], a perfluorooxyalkyl (meth)acrylate, [such as perfluorododecyloxyethyl (meth)acrylate, and perfluorodecyloxyethyl (meth)acrylate], a fluorinated C1-C18 alkyl crotonate, a fluorinated C1-C18 alkyl malate and fumarate, a fluorinated C1-C18 alkyl itaconate, a fluorinated alkyl-substituted-olefin (number of carbon atoms: about 2 to 10, number of fluorine atoms: about 1 to 17), such as perfluorohexylethylene, a fluorinated olefin having about 2 to 10 carbon atoms and about 1 to 20 fluorine atoms, in which a fluorine atom bonds to a carbon atom with a double bond, tetrafluoroethylene, trifluoroethylene, vinylidene fluoride, and hexafluoropropylene. Further, as a binder, a copolymer of a fluorine compound and a monomer having an ethylenic double bond without a fluorine atom as described below may be also named.

As another example of a binder, a non-fluorinated polymer may be named. A non-fluorinated polymer means a polymer containing no fluorine. A second electrode preferably contains a non-fluorinated polymer, so that the initial irreversible capacity of a sodium secondary battery can be decreased. An example of a non-fluorinated polymer is an addition polymer of a monomer having an ethylenic double bond without a fluorine atom. Examples of such a monomer include:

a (meth)acrylic acid ester monomer including a C1-C22 (cyclo)alkyl (meth)acrylate, [such as methyl (meth)acrylate, ethyl (meth)acrylate, n-butyl (meth)acrylate, isobutyl (meth)acrylate, cyclohexyl (meth)acrylate, 2-ethylhexyl (meth)acrylate, isodecyl (meth)acrylate, lauryl (meth)acrylate, and octadecyl (meth)acrylate]; a (meth)acrylate containing an aromatic ring, [such as benzyl (meth)acrylate, and phenylethyl (meth)acrylate]; an alkylene glycol or dialkylene glycol mono(meth)acrylate (number of carbon atoms in the alkylene group: 2 to 4), [such as 2-hydroxyethyl (meth)acrylate, 2-hydroxypropyl (meth)acrylate, and diethylene glycol mono(meth)acrylate]; (poly)glycerol mono(meth)acrylate (degree of polymerization of (poly)glycerol: 1 to 4); and a multifunctional (meth)acrylate, [such as (poly)ethylene glycol di(meth)acrylate (degree of polymerization of (poly)ethylene glycol: 1 to 100), (poly)propylene glycol di(meth)acrylate (degree of polymerization of (poly)ethylene glycol: 1 to 100), 2,2-bis(4-hydroxyethylphenyl)propane di(meth)acrylate, and trimethylolpropane tri(meth)acrylate];

a (meth)acrylamide monomer, including (meth)acrylamide, and a (meth)acrylamide derivative, [such as N-methylol (meth)acrylamide, and diacetone acrylamide];

a monomer containing a cyano group, including (meth)acrylonitrile, 2-cyanoethyl (meth)acrylate, and 2-cyanoethyl acrylamide;

a styrenic monomer, including styrene and a C7-C18 styrene derivative, [such as α-methylstyrene, vinyl toluene, p-hydroxystyrene, and divinylbenzene];

a diene monomer, including a C4-C12 alkadiene, [such as butadiene, isoprene, and chloroprene];

an alkenyl ester monomer, including a C2-C12 carboxylic acid vinyl ester, [such as vinyl acetate, vinyl propionate, vinyl butyrate, and vinyl octanoate]; and a C2-C12 carboxylic acid (meth)allyl ester, [such as (meth)allyl acetate, (meth)allyl propionate, and (meth)allyl octanoate];

a monomer containing an epoxy group, including glycidyl (meth)acrylate, and (meth)allyl glycidyl ether;

a monoolefin, including a C2-C12 monoolefin, [such as ethylene, propylene, 1-butene, 1-octene and 1-dodecene];

a monomer containing a halogen atom other than fluorine, including a monomer containing a chlorine, bromine or iodine atom, vinyl chloride and vinylidene chloride;

a (meth)acrylic acid, including acrylic acid and methacrylic acid; and a monomer having a conjugated double bond, including butadiene and isoprene. An addition polymer may be a copolymer, such as an ethylene-vinyl acetate copolymer, a styrene-butadiene copolymer, and an ethylene-propylene copolymer. Further, a carboxylic acid vinyl ester polymer may be partially or totally saponified like polyvinyl alcohol.

Other examples of a binder include polysaccharides and derivatives thereof, such as starch, methylcellulose, carboxymethyl cellulose, hydroxymethyl cellulose, hydroxyethyl cellulose, hydroxypropyl cellulose, carboxymethylhydroxyethyl cellulose, nitrocellulose; a phenol resin; a melamine resin; a polyurethane resin; a urea resin; a polyamide resin; a polyimide resin; a polyamide-imide resin; petroleum pitch; coal pitch. A plurality of binders may be used as a binder.

The aforedescribed binder may occasionally function as a thickener in an electrode mixture.

Regarding the contents of the constituents of a second electrode, the content of a binder is usually about 0.5 to 30 parts by weight, preferably about 2 to 20 parts by weight, based on 100 parts by weight of a carbonaceous material.

Examples of a solvent include non-protic polar solvents, such as N-methylpyrrolidone; alcohols, such as isopropyl alcohol, ethyl alcohol, and methyl alcohol; ethers, such as propylene glycol dimethyl ether; ketones, such as acetone, methyl ethyl ketone and methyl isobutyl ketone. If a binder is thickening, a plasticizer may be used to facilitate coating on a current collector.

As a conductive additive, besides various conductive additives a carbonaceous material not satisfying the R value requirement may be used. One of the examples of the carbonaceous material is graphite. A carbonaceous material according to the present invention can function also as a conductive additive.

First Electrode

Examples of a first electrode include an electrode composed of a sodium metal or a sodium alloy, an electrode composed of a laminate of a current collector with a sodium metal or a sodium alloy, and an electrode containing an inorganic sodium compound, to/from which sodium ions can be doped and dedoped. Such an electrode containing a inorganic sodium compound (hereinafter occasionally referred to as Na compound), to/from which sodium ions can be doped and dedoped, is constituted with a current collector, which carries an electrode mixture containing a Na compound, a binder, a conductive additive, etc. and is usually in a sheet form. In this case, examples of a process for producing a first electrode include:

(1) a process, by which an electrode mixture is prepared by adding a solvent to a Na compound, a binder, a conductive additive, etc., a current collector is coated therewith by a doctor blade method, etc., or is immersed therein, and then the same is dried; (2) a process, by which a sheet is prepared by adding a solvent to a Na compound, a binder, a conductive additive, etc., kneading the mixture, forming and drying, the sheet is combined onto a surface of a current collector by means of a conductive adhesive, etc. followed by pressing, heat-treating and drying; and (3) a process, by which a mixture of a Na compound, a binder, a conductive additive, a liquid lubricant, etc. is cast on a current collector, the liquid lubricant is removed, and then a resulted sheet-like formation is elongated mono- or multi-axially. In case a first electrode is in a sheet form, the thickness is usually about 5 to 500 μm.

As examples of a Na compound, the following compounds may be listed. Namely an oxide expressed by $NaM^1{}_aO_2$, such as $NaFeO_2$, $NaMnO_2$, $NaNiO_2$ and $NaCoO_2$, an oxide expressed by $Na_{0.44}Mn_{1-a}M^1{}_aO_2$, an oxide expressed by $Na_{0.7}Mn_{1-a}M^1{}_aO_{2.05}$ ($M^1$ is one or more transition metal elements, $0 \le a < 1$); an oxide expressed by $Na_bM^2{}_cSi_{12}O_{30}$, such as $Na_6Fe_2Si_{12}O_{30}$ and $Na_2Fe_5Si_{12}O_{30}$ ($M^2$ is one or more transition metal elements, $2 \le b \le 6$, $2 \le c \le 5$); an oxide expressed by $Na_dM^3{}_eSi_6O_{18}$, such as $Na_2Fe_2Si_6O_{18}$ and $Na_2MnFeSi_6O_{18}$ ($M^3$ is one or more transition metal elements, $3 \le d \le 6$, $1 \le e \le 2$); an oxide expressed by $Na_fM^4{}_gSi_2O_6$, such as $Na_2FeSiO_6$ ($M^4$ is one or more transition metal elements selected from the group consisting of Mg and Al, $1 \le f \le 2$, $1 \le g \le 2$); a phosphate, such as $NaFePO_4$, $Na_3Fe_2(PO_4)_3$; a borate, such as $NaFeBO_4$ and $Na_3Fe_2(BO_4)_3$; a fluoride expressed by $Na_hM^5F_6$, such as $Na_3FeF_6$ and $Na_2MnF_6$ ($M^5$ is one or more transition metal elements, $2 \le h \le 3$).

Among the afore-listed Na compounds, the compounds containing Fe can be used preferably in a first electrode. The use of a compound containing Fe is very meaningful from a viewpoint of constructing a secondary battery with materials that are rich in resources and inexpensive.

Examples of a conductive additive to be usable in a first electrode may include various carbonaceous materials, such as natural graphite, artificial graphite, cokes and carbon black. A carbonaceous material according to the present invention may be used as a conductive additive in a first electrode.

Examples of a current collector for a first electrode include a metal, such as nickel, aluminium, titanium, copper, gold, silver, platinum, an aluminium alloy and a stainless steel; those formed by plasma spraying or arc spraying of, for example, a carbonaceous material, an activated carbon fiber, nickel, aluminium, zinc, copper, tin, lead, or an alloy thereof, and a conductive film of a polymer, such as rubber and a styrene-ethylene-butylene-styrene copolymer (SEBS) dispersed with a conductive additive. Especially, aluminium, nickel or a stainless steel is preferable, and especially aluminium is preferable, as it can be fabricated easily to a thin foil and is inexpensive. Examples of a form of a current collector include a foil, a lamina, a mesh, a net, a lath, a punched or embossed form, and a combination thereof (for example, a meshed lamina). A surface of a current collector may be roughened by etching.

For a first electrode, the similar binder or solvent as for a second electrode can be used. Hereinabove a conductive adhesive means a mixture of a conductive additive and a binder.

Regarding the contents of the constituents of a first electrode, the content of a binder is usually about 0.5 to 30 parts by weight, preferably about 2 to 30 parts by weight, based on 100 parts by weight of a Na compound; the content of a conductive additive is usually about 1 to 50 parts by weight, preferably about 1 to 30 parts by weight, based on 100 parts by weight of a Na compound; and the content of a solvent is usually about 50 to 500 parts by weight, preferably about 100 to 200 parts by weight, based on 100 parts by weight of a Na compound.

Electrolyte

An electrolyte is usually dissolved in an organic solvent and used as a nonaqueous electrolyte solution. Examples of an electrolyte to be used in a sodium secondary battery include a sodium salt, such as $NaClO_4$, $NaPF_6$, $NaBE_4$, $NaCF_3SO_3$, $NaN(CF_3SO_2)_2$, $NaN(C_2F_5SO_2)_2$, and $NaC(CF_3SO_2)_3$.

The concentration of an electrolyte in an nonaqueous electrolyte solution may be determined appropriately considering the solubility of an electrolyte in an electrolyte solution, and is usually about 0.2 to 5 mol (electrolyte)/L (electrolyte solution), preferably about 0.3 to 3 mol (electrolyte)/L (electrolyte solution), and in particular preferably about 0.8 to 1.5 mol (electrolyte)/L (electrolyte solution). In case the concentration is 0.2 mol/L or higher, the ion conductivity of an electrolyte solution increases, so that the internal resistance of a sodium secondary battery favorably tends to decrease. In case it is 5 mol/L or lower, the viscosity of an electrolyte solution decreases, so that the internal resistance of a sodium secondary battery favorably tends to decrease.

As an organic solvent to dissolve an electrolyte, a polar organic solvent is used. The water content in an electrolyte solution including a polar organic solvent is usually 200 ppm by weight or less, preferably 50 ppm by weight or less, and further preferably 20 ppm by weight or less. By limiting the water content in an electrolyte solution including a polar organic solvent, influence of electrolysis of water on an electrode, in particular decrease of the withstanding voltage, can be suppressed.

Specific examples of a polar organic solvent are recited below.

(Ether)

Monoether (ethylene glycol monomethyl ether, ethylene glycol monoethyl ether, diethylene glycol monomethyl ether, diethylene glycol monoethyl ether, ethylene glycol monophenyl ether, tetrahydrofuran, 3-methyltetrahydrofuran, etc.), diether (ethylene glycol dimethyl ether, ethylene glycol diethyl ether, diethylene glycol dimethyl ether, diethylene glycol diethyl ether, diethyl ether, methyl isopropyl ether, etc.), triethylene glycol dimethyl ether, ethylene glycol monomethyl ether acetate, cyclic ether [C2 to C4 (tetrahydrofuran, 2-methyltetrahydrofuran, 1,3-dioxolane, 1,4-dioxane, 2-methyl-1,3-dioxolane, etc.); 4-butyldioxolane, a C5 to C18 crown ether], etc.

(Fluorinated Dioxolane)

2,2-di(trifluoromethyl)-1,3-dioxolane, 2,2-di(trifluoromethyl)-4,5-difluoro-1,3-dioxolane, 2,2-di(trifluoromethyl)-4,4,5,5-tetrafluoro-1,3-dioxolane, 2,2-dimethyl-4,4,5,5-tetrafluoro-1,3-dioxolane, 2,2-dimethyl-4,5-difluoro-1,3-dioxolane, etc.

(Amide)

Formamides (N-methylformamide, dimethylformamide, N-ethylformamide, N,N-diethylformamide, etc.), acetamides (N-methylacetamide, N,N-dimethylacetamide, N-ethylacetamide, N,N-diethylacetamide, etc.), propionamides (N,N-dimethylpropionamide, etc.), hexamethylphosphorylamide, etc., oxazolidinones; N-methyl-2-oxazolidinone, 3,5-dimethyl-2-oxazolidinone, etc., 1,3-dimethyl-2-imidazolidinone, N-methylpyrrolidone, etc.

(Nitrile)

Acetonitrile, glutaronitrile, adiponitrile, methoxyacetonitrile, 3-methoxypropionitrile, acrylonitrile, fluorinated propionitrile derived from propionitrile by substituting fluorine atom(s) for 1 or more hydrogen atom(s).

(Carboxylic Acid Ester)

Methyl formate, ethyl formate, methyl acetate, ethyl acetate, propyl acetate, methyl propionate, methyl butyrate, methyl valerate, ethyl propionate, dimethyl malonate, diethyl malonate, etc., maleic anhydride and a derivative thereof, etc.

(Lactone)

γ-Butyrolactone, 3-methyl-γ-butyrolactone, 2-methyl-γ-butyrolactone, α-acetyl-γ-butyrolactone, β-butyrolactone, γ-valerolactone, 3-methyl-γ-valerolactone, δ-valerolactone, etc.

(Carbonate)

Ethylene carbonate, propylene carbonate, butylene carbonate, vinylene carbonate, dimethyl carbonate, methyl ethyl carbonate, methyl propyl carbonate, methyl isopropyl carbonate, diethyl carbonate, 4-allyloxymethyl-1,3-dioxolane-2-one, 4-(1'-propenyloxymethyl)-1,3-dioxolane-2-one, 4-allyloxymethyl-5-vinyl-1,3-dioxolane-2-one, 4-(1'-propenyloxymethyl)-5-vinyl-1,3-dioxolane-2-one, 4-acryloyloxymethyl-1,3-dioxolane-2-one, 4-methacryloyloxymethyl-1,3-dioxolane-2-one, 4-methacryloyloxymethyl-5-vinyl-1,3-dioxolane-2-one, 4-methoxycarbonyloxymethyl-1,3-dioxolane-2-one, 4-allyloxycarbonyloxymethyl-1,3-dioxolane-2-one, 4-(1'-propenyloxycarbonyloxymethyl)-1,3-dioxolane-2-one, 4-vinylethylene carbonate, 4,5-divinylethylene carbonate, 4,4,5,5-tetramethyl-1,3-dioxolane-2-one, 4,4,5,5-tetraethyl-1,3-dioxolane-2-one, vinylene carbonate, 4-methylvinylene carbonate, 4,5-dimethylvinylene carbonate, 5,5-dimethyl-1,3-dioxane-2-one, and 5,5-diethyl-1,3-dioxane-2-one, dipropyl carbonate, methyl butyl carbonate, ethyl butyl carbonate, ethyl propyl carbonate, butyl propyl carbonate, and a compound derived from a compound listed above by substituting fluorine atom(s) for 1 or more hydrogen atom(s).

(Sulfoxide)

Dimethyl sulfoxide, sulfolane, 3-methyl sulfolane, 2,4-dimethyl sulfolane, and a fluorinated sulfolane derived from sulfolane by substituting fluorine atom(s) for 1 or more hydrogen atom(s); 1,3-propane sultone, 1,4-butane sultone, etc. and a compound substituting fluorine atom(s) for 1 or more hydrogen atom(s), etc.

(Sulfone)

Dimethyl sulfone, diethyl sulfone, di-n-propylsulfone, diisopropyl sulfone, di-n-butyl sulfone, di-sec-butyl sulfone, di-tert-butyl sulfone, etc.

(Nitro Compound)

Nitromethane, nitroethane, etc.

(Other Heterocyclic Compounds)

N-methyl-2-oxazolidinone, 3,5-dimethyl-2-oxazolidinone, 1,3-dimethyl-2-imidazolidinone, methylpyrrolidinone, etc.

(Hydrocarbon)

Aromatic solvents (toluene, xylene, ethylfluorobenzene, fluorobenzene derived from benzene by substituting fluorine atom(s) for 1 to 6 hydrogen atom(s), etc.), paraffin solvents (normal paraffin, isoparaffin, etc.), etc.

(Silicon Compound)

All having a silicon atom in a molecule: oxazolidinone compounds, such as 3-trimethylsilyl-2-oxazolidinone, 3-trimethylsilyl-4-trifluoromethyl-2-oxazolidinone, and 3-triethylsilyl-2-oxazolidinone; imidazole compounds, such as N-trimethylsilyl imidazole, N-trimethylsilyl-4-methylimidazole, and N-(triethylsilyl)imidazole; phosphate compounds, such as tris(trimethylsilyl)phosphate, tris(triethylsilyl)phosphate, trimethylsilyldimethyl phosphate, and trimethylsilyldiallyl phosphate; cyclic carbonate compounds, such as 4-trimethylsilyl-1,3-dioxolane-2-one, 4-trimethylsilyl-5-vinyl-1,3-dioxolane-2-one, and 4-trimethylsilylmethyl-1,3-dioxolane-2-one; phenyl compounds, such as phenyltrimethylsilane, phenyltriethylsilane, phenyltrimethoxysilane, phenylthiotrimethylsilane, and phenylthiotriethylsilane; carbamate compounds, such as methyl-N-trimethylsilyl carbamate, methyl-N,N-bistrimethylsilyl carbamate, ethyl-N-trimethylsilyl carbamate, methyl-N-triethylsilyl carbamate, and vinyl-N-trimethylsilyl carbamate; carbonate compounds, such as methyltrimethylsilyl carbonate, allyltrimethylsilyl carbonate, and ethyltrimethylsilyl carbonate; methoxytrimethylsilane, hexamethyldisiloxane, pentamethyldisiloxane, methoxymethyltrimethylsilane, trimethylchlorosilane, butyldiphenylchlorosilane, trifluoromethyltrimethylsilane, acetyltrimethylsilane, 3-trimethylsilylcyclopentene, allyltrimethylsilane, vinyltrimethylsilane, hexamethyldisilazane, etc.

As a polar organic solvent, a mixture of two or more different solvents may be used.

As a polar organic solvent to be incorporated in an electrolyte solution, in particular a solvent containing an ester solvent, such as carbonates and lactones as a main component is preferred, and especially preferred is an ester solvent containing as a main component at least one selected from the group consisting of propylene carbonate, ethylene carbonate, butylene carbonate, dimethyl carbonate, ethyl methyl carbonate, isopropyl methyl carbonate, vinylene carbonate and diethyl carbonate. The expression "as a main component" means herein that 50 weight-% or more, preferably 70 weight-% or more of a solvent occupies an ester solvent.

An ether solvent has been generally used in a sodium secondary battery with a conventional electrode. A sodium secondary battery with an electrode according to the present invention can be charged and discharged well even using an ester solvent. Since an ester solvent is superior in acid resistance, a sodium secondary battery with an electrolyte solution using an ester solvent can select a high positive electrode potential during operation, so that the charge-discharge capacity per volume (energy density) of the battery can be improved. Further, it tends to suppress rapid degradation of the electrolyte solution.

According to need, various additives may be added to an electrolyte solution. More specifically, for suppressing gas generation and improving the voltage resistance a phosphoric ester (trimethyl phosphate, triethyl phosphate, triallyl phosphate, etc.) and a phosphonic acid group, and for higher capacity and higher power fluorinated organic silicon compounds according to the following formulas are exemplified.

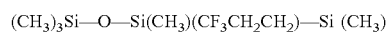

The amount of a phosphoric ester to be added is usually about 10 weight-% or less from viewpoints of the electroconductivity of an electrolyte and the solubility in an electrolyte solvent, and the amount of a fluorinated organic silicon compound to be added is about 0.1 to 5 weight-% in an electrolyte solution.

A benzoic acid group, which is a type of polar organic solvents, (including, for example, benzoic acid alkyl esters, such as methyl benzoate, ethyl benzoate, and propyl benzoate, and benzoic acid), may be used as an additive for preventing a metal from dissolving out of a current collector. In case a benzoic acid group is used as an additive, the amount is usually about 0.001 to 10.0 weight-% based on an electrolyte, preferably 0.005 to 5 weight-%, and especially preferably 0.1 to 1 weight-%.

Separator

A separator plays a role to separate a first electrode and a second electrode, while allowing sodium ions to pass. For a separator is used commonly a membrane that can hold an electrolyte solution and is an insulation. A separator may use a member in a form of a porous membrane, a nonwoven fabric, or a woven fabric, made of a polyolefin resin, such as polyethylene, and polypropylene, a fluorocarbon polymer, an aromatic polymer containing nitrogen, etc. In this case a separator may be made of two or more materials, and the members may be laminated together. Examples of a separator are described, for example, in JP2000-30686A and JP10-324758A. The pore size of a separator is usually about 0.01 to 10 μm. The thickness of a separator should be thinner, insofar as the mechanical strength suffice, because the energy density per volume of a battery can be higher and the internal resistance can be lower, and is usually about 1 to 300 μm, preferably about 5 to 40 μm. From a viewpoint of the ion permeability of a separator, the air permeance according to Gurley method is preferably 50 to 300 sec/100 cc, and more preferably 50 to 200 sec/100 cc. While, the porosity of a separator is usually 30 to 80 volume-%, and preferably 40 to 70 volume-%. A separator may be prepared by laminating separators of different porosities.

It is usually preferable that a sodium secondary battery should have a function to shutdown the system by cutting off the current, when an abnormal current should flow in the battery by a short circuit between a positive electrode and a negative electrode, or otherwise, so as to block an overcurrent. The shutdown can be exercised by closing micropores in a separator when the temperature exceeds a normal working temperature. After the micro-pores in a separator are closed, the separator should preferably not rupture and should maintain the closed condition of the micro-pores in the separator, even when the temperature in a battery should rise to a certain high temperature. Examples of such a separator include a porous film with a heat-resistant material, and a laminated film combining a heat-resistant porous layer and a porous film, and the use of a film for a separator can enhance the heat resistance of a sodium secondary battery.

Next, more details of a laminated film combining a heat-resistant porous layer and a porous film will be described. In such a laminated film, a heat-resistant porous layer has higher heat resistance than a porous film, and the heat-resistant porous layer may be constituted of inorganic particles, or contain a heat-resistant resin. In case a heat-resistant porous layer should contain a heat-resistant resin, a heat-resistant porous layer can be formed easily by a coating process, etc. Example of a heat-resistant resin include polyamide, polyimide, polyamide-imide, polycarbonate, polyacetal, polysulfone, polyphenylene sulfide, polyetherketone, aromatic polyester, polyethersulfone, and polyetherimide; and from the viewpoint of a higher heat resistance, are preferable polyamide, polyimide, polyamide-imide, polyethersulfone, and polyetherimide; and more preferable are polyamide, polyimide, and polyamide-imide. Further preferable are aromatic polymers containing nitrogen, such as an aromatic polyamide (para-oriented aromatic polyamide, meta-oriented aromatic polyamide), an aromatic polyimide, and an aromatic polyamide-imide, especially preferable is an aromatic polyamide, and from a standpoint of production especially preferable is a para-oriented aromatic polyamide (hereinafter occasionally referred to as "para-aramid". Further, other examples of a heat-resistant resin may include poly-4-methylpentene-1, and a cyclic olefin polymer. Using such a heat-resistant resin, the heat resistance, in other words, the thermal rupture temperature may be increased. In case, among the heat-resistant resins, an aromatic polymer containing nitrogen is used, probably due to its intra-molecular polarity, the compatibility with a nonaqueous electrolyte solution, namely the liquid retention property in a heat-resistant porous layer, is extremely improved, and the impregnating speed of a nonaqueous electrolyte solution in manufacturing a sodium secondary battery becomes higher, and the charge-discharge capacity of a sodium secondary battery becomes also higher.

The afore-mentioned thermal rupture temperature depends on a kind of a heat-resistant resin and is selected appropriately according to an application condition and purpose. In case the aromatic polymer containing nitrogen is used as a heat-resistant resin, the thermal rupture temperature can be controlled at about 400° C.; in case poly-4-methylpentene-1 is used, at about 250° C.; and in case a cyclic olefin polymer is used, at about 300° C. respectively. Further, in case a heat-resistant porous layer is composed of inorganic powder, the thermal rupture temperature can be controlled, for example, at 500° C. or higher.

The para-aramid can be synthesized by a condensation polymerization of a para-oriented aromatic diamine and a para-oriented aromatic dicarboxylic acid halide, and is substantially constituted by repetition units bonded by amide bonds formed at a para-position or a quasi-para-position (for example, as in 4,4-biphenylene, 1,5-naphthalene, 2,6-naphthalene, etc. orienting reversely on the same axis or in parallel). Specific examples include a para-aramid having a para-oriented structure or a quasi-para-oriented structure, such as poly(p-phenylene terephthalamide), poly(p-benzamide), poly(4,4'-benzanilide terephthalamide), poly(p-phenylene-4,4'-biphenylenedicarboxylic acid amide), poly(p-phenylene-2,6-naphthalenedicarboxylic acid amide), poly (2-chloro-p-phenylene terephthalamide), and p-phenylene terephthalamide/2,6-dichloro-p-phenylene terephthalamide copolymer.

As an aromatic polyimide, a wholly aromatic polyimide yielded by condensation polymerization of an aromatic dianhydride and a diamine is preferable. Specific examples of a dianhydride include pyromellitic dianhydride, 3,3',4,4'-diphenylsulfone tetracarboxylic dianhydride, 3,3',4,4'-benzophenonetetracarboxylic dianhydride, 2,2'-bis(3,4-dicarboxyphenyl)hexafluoropropane, and 3,3',4,4'-biphenyltetracarboxylic dianhydride. Specific examples of a diamine include oxydianiline, p-phenylenediamine, benzophenonediamine, 3,3'-methylenedianiline, 3,3'-diaminobenzophenone, 3,3'-diaminodiphenyl sulfone, and 1,5'-naphthalenediamine. Further, polyimide soluble in a solvent can be favorably utilized. An example of such a polyimide is a polyimide prepared by polycondensation of 3,3',4,4'-diphenylsulfone tetracarboxylic dianhydride and an aromatic diamine.

Examples of an aromatic polyamide-imide include that prepared by condensation polymerization of an aromatic dicarboxylic acid and an aromatic diisocyanate; and that prepared by condensation polymerization of an aromatic dianhydride and an aromatic diisocyanate. Specific examples of an aromatic dicarboxylic acid include isophthalic acid and terephthalic acid. A specific example of an aromatic dianhydride includes trimellitic anhydride. Specific examples of an aromatic diisocyanate include 4,4'-diphenylmethane diisocyanate, 2,4-tolylene diisocyanate, 2,6-tolylene diisocyanate, o-tolylene diisocyanate, and m-xylene diisocyanate.

For the sake of higher sodium ion permeability the thickness of a heat-resistant porous layer is preferably as thin as 1 µm to 10 µm, more preferably 1 µm to 5 µm, and especially 1 µm to 4 µm. Meanwhile, a heat-resistant porous layer has micro-pores, whose pore size (diameter) is usually 3 µm or less, and preferably 1 µm or less.

In case a heat-resistant porous layer contains a heat-resistant resin, it may further contain a filler. A raw material for a filler may be selected from an organic powder, an inorganic powder, or a mixture of the two. Powders constituting a filler have preferably the mean particle size of 0.01 µm to 1 µm.

Examples of an organic powder include a homopolymer of, or a copolymer of 2 or more of, styrene, vinyl ketone, acrylonitrile, methyl methacrylate, ethyl methacrylate, glycidyl methacrylate, glycidyl acrylate, methyl acrylate, etc.; a fluorine containing resin, such as polytetrafluoroethylene, a tetrafluoroethylene-hexafluoropropylene copolymer, a tetrafluoroethylene-ethylene copolymer, and polyvinylidenefluoride; a powder of an organic material, such as a melamine resin, a urea resin, a polyolefin, and a polymethacrylate. An organic powder may be used singly or in combination of two or more kinds. Among the organic powders, a polytetrafluoroethylene powder is preferred in viewpoint of the chemical stability.

Examples of an inorganic powder include powders of inorganic materials, such as a metal oxide, a metal nitride, a metal carbide, a metal hydroxide, a carbonate, and a sulfate, and among them a powder of an inorganic material with the low electric conductivity is used preferably. Specific examples thereof include powders of alumina, silica, titanium dioxide, and calcium carbonate. An inorganic powder may be used singly or in combination of two or more kinds. Among the inorganic powders, an alumina powder is preferred in viewpoint of the chemical stability. In this case, all of the particles that constitute a filler are preferably alumina particles, and more preferably is an embodiment in which all of the particles that constitute a filler are alumina particles and a part of or all of them are almost spherical alumina particles. In this connection, when a heat-resistant porous layer is formed by an inorganic powder, the afore-listed inorganic powder may be used, and according to need it may be used as a mixture with a binder.

In case a heat-resistant porous layer contains a heat-resistant resin, the content of a filler, although it depends on the specific gravity of a filler material, is usually 5 to 95% by weight based on the total weight of the heat-resistant porous layer as 100%, preferably 20 to 95%, and more preferably 30 to 90%. The above range is especially favorable, in case all of the particles that constitute a filler are alumina particles.

Examples of a filler form include approximately spherical, scaly, columnar, needle-shaped, whisker-shaped, and fibrous forms, and a powder of any form may be used. However, for the sake of easier formation of uniform pores, an approximately spherical powder is preferable. As an approximately spherical powder, a powder having a powder aspect ratio (the major axis of a powder/the minor axis of a powder) in a range of 1 to 1.5 is exemplified. The aspect ratio of a powder can be measured by an electron microscope photograph.

As described above a heat-resistant porous layer may contain two or more kinds of fillers. In this case, with respect to the measured mean particle diameters of particles constituting the respective fillers, when expressing the largest value as $D_1$, and the second largest vale as $D_2$, $D_2/D_1$ is preferably 0.15 or less. This enables well-balanced presence of smaller-sized micro-pores and larger-sized micro-pores in micro-pores in a heat-resistant porous layer of a laminated film. The structure by the smaller-sized micro-pores enables the heat resistance of a separator made of the laminated film to be improved, and the structure by the larger-sized micro-pores enables the sodium ion permeability to be improved, so that a sodium secondary battery to be constructed can generate a higher power at a high current rate, namely the rate performance can be favorably superior. In doing the above, the mean particle diameter may employ a value measured from an electron microscope photograph. More particularly, when particles (filler particles) appeared on a scanning electron microscope photograph of a surface or a section of a heat-resistant porous layer of a laminated film are classified by size, and among the mean particle diameters of the respective classes, the largest value being taken as $D_1$ and the second largest value as $D_2$, the $D_2/D_1$ value should be 0.15 or less. For determining a mean particle size, 25 particles are extracted at random with respect to each class, which particle sizes (diameters) are measured and averaged. The averaged value of 25 particle sizes is employed as the mean particle size. The particle constituting a filler described above means a primary particle constituting a filler.

A porous film in a laminated film has micro-pores, and, usually, a shutdown function. The size (diameter) of micro-pores in a porous film is usually 3 µm or less, and preferably 1 µm or less. The porosity of a porous film is usually 30 to 80 volume-%, and preferably 40 to 70 volume-%. If the temperature of a sodium secondary battery exceeds a normal working temperature, micro-pores can be closed by deformation or softening of a porous film according to the shut-down function.

As a resin constituting a porous film, a resin that does not dissolve in a nonaqueous electrolyte solution in a sodium secondary battery should be selected. Specific examples thereof include a polyolefin resin, such as polyethylene and polypropylene, and a thermoplastic polyurethane resin, and a mixture of two or more thereof may be also used. In order to shutdown by softening at a lower temperature, a porous film should preferably contain a polyolefin resin, and more preferably polyethylene. Specific examples of polyethylene include low density polyethylene, high density polyethylene, and linear polyethylene, as well as ultra high molecular weight polyethylene may be also included. In order to increase the puncture resistance of a porous film, a constituting resin should preferably contain at least ultra high molecular weight polyethylene. In some cases from the standpoint of manufacturing a porous film, a wax made of a polyolefin with a low molecular weight (the weight-average molecular weight of 10,000 or less) should preferably be contained.

The thickness of a porous film is usually 3 to 30 µm, and further preferably 3 to 20 µm. While, the thickness of a laminated film is usually 40 µm or less, and preferably 20 µm or less. Expressing the thickness of a heat-resistant porous layer as A (µm), and the thickness of a porous film as B (µm), the value of A/B is preferably 0.1 to 1.

An example of manufacture of a laminated film is described below.

Firstly, a manufacturing process for a porous film will be described. There is no particular restriction on a manufacturing process for a porous film, and a process as described in JP7-29563A, by which a thermoplastic resin mixed with a plasticizer is formed into a film and then the plasticizer is removed by an appropriate solvent, or a process as described in JP7-304110A, by which using a thermoplastic resin film manufactured by a conventional method, structurally weak amorphous parts of the film are selectively stretched to form micro-pores, may be exemplified. In case, for example, a porous film is formed by a polyolefin resin containing ultra high molecular weight polyethylene and a low molecular weight polyolefin (the weight-average molecular weight of 10,000 or less), the manufacturing process described below is preferable from a standpoint of the manufacturing cost. That is, a process including:
(1) a step for preparing a polyolefin resin composition by kneading 100 parts by weight of ultra high molecular weight polyethylene, 5 to 200 parts by weight of a low molecular weight polyolefin (the weight-average molecular weight of 10,000 or less) and 100 to 400 parts by weight of an inorganic filler;
(2) a step for sheeting the polyolefin resin composition;
(3) a step for removing the inorganic filler from the sheet prepared at step (2);
(4) a step for stretching the sheet prepared at step (3) to yield a porous film;
or a process including:
(1) a step for preparing a polyolefin resin composition by kneading 100 parts by weight of ultra high molecular weight polyethylene, 5 to 200 parts by weight of a low molecular weight polyolefin (the weight-average molecular weight of 10,000 or less) and 100 to 400 parts by weight of an inorganic filler;
(2) a step for sheeting the polyolefin resin composition;
(3) a step for stretching the sheet prepared at step (2);
(4) a step for removing the inorganic filler from the sheet prepared at step (3) to yield a porous film.

The mean particle size (diameter) of an applicable inorganic filler is, from viewpoints of the strength and the ion permeability of a porous film, preferably 0.5 µm or less, and more preferably 0.2 µm or less. In this case, the mean particle size may employ a value measured from an electron microscope photograph. More particularly, 50 particles are extracted at random from particles of the inorganic filler appeared on an electron microscope photograph, which respective particle sizes are measured and averaged.

Examples of an inorganic filler include calcium carbonate, magnesium carbonate, barium carbonate, zinc oxide, calcium oxide, aluminium hydroxide, magnesium hydroxide, calcium hydroxide, calcium sulfate, silicic acid, zinc oxide, calcium chloride, sodium chloride, and magnesium sulfate. Such inorganic filler can be removed from a sheet or a film by an acid or alkali solution. From viewpoints of controllability of the particle size and selective solubility in an acid, the use of calcium carbonate is preferable.

There is no particular restriction on a process for preparing the aforedescribed polyolefin resin composition, and source materials composing a polyolefin resin composition, such as a polyolefin resin and an inorganic filler, are blended by a mixing apparatus, such as a roll, a Bambury mixer, a single screw extruder, and a twin screw extruder, to yield a polyolefin resin composition. On occasion of blending source materials, an additive, such as a fatty acid ester, a stabilizer, an antioxidant, a UV absorber, and a flame retardant may be added according to need.

There is no particular restriction on a process for manufacturing a sheet composed of a polyolefin resin composition, and it can be manufactured by a sheeting process, such as a blown film process, a calendering process, a T-die extrusion process, and a Scaife process. Since a sheet with high thickness accuracy can be obtained, it should preferably be manufactured according to the following process.

A preferable manufacturing process for a sheet of a polyolefin resin composition is a roll-forming of a polyolefin resin composition using a pair of rotating forming tools, whose surface temperature is regulated higher than the melting point of a polyolefin resin contained in the polyolefin resin composition. The surface temperature of a rotating forming tool is preferably (the melting point+5)° C. or higher. The upper limit of the surface temperature is preferably (the melting point+30)° C. or less, and more preferably (the melting point+20)° C. or less. As a pair of rotating forming tools, rolls and belts are exemplified. The circumferential velocities of both the rotating forming tools should not necessarily be exactly identical, but the difference should be within a range of about ±5%. By producing a porous film using a sheet manufactured by such a process, a porous film superior in the strength, ion permeability, air permeance, etc., can be obtained. A laminate of single layer sheets manufactured respectively by the aforedescribed process may be used for producing a porous film.

When a polyolefin resin composition is rolled by a pair of rotating forming tools, a polyolefin resin composition extruded from an extruder in a strand form may be directly supplied between the rotating forming tool pair, or a once pelletized polyolefin composition may be supplied.

To stretch a sheet of a polyolefin resin composition, or a sheet prepared by removing an inorganic filler from a sheet, a tenter, rolls or an autograph can be used. From the viewpoint of the air permeance the stretch ratio is preferably 2 to 12, and more preferably 4 to 10. The stretching temperature is usually a temperature of not lower than the softening point and not higher than the melting point of a polyolefin resin, and preferably 80 to 115° C. If the stretching temperature is too low, sheet breakage takes place easier, and if it is too high, the gas permeance or ion permeability of the resulted film may become too low. It is preferable to conduct heat-setting after stretching. The heat-setting temperature is preferably a temperature of less than the melting point of a polyolefin resin.

A porous film containing a thermoplastic resin and a heat-resistant porous layer prepared by processes as described above are laminated together to yield a laminated film. The heat-resistant porous layer may be provided either on one side or both sides of a porous film.

As a process for laminating a porous film and a heat-resistant porous layer, a process by which a heat-resistant porous layer and a porous film are manufactured individually and the two are laminated, and a process by which a coating liquid containing a heat-resistant resin and a filler is applied on at least one side of a porous film to form a heat-resistant porous layer, are exemplified. In case a heat-resistant porous layer is relatively thin, the latter method is preferable from a viewpoint of the productivity. As a specific example of a process, by which a coating liquid containing a heat-resistant resin and a filler is coated on at least one side of a porous film to form a heat-resistant porous layer, a process with the following steps is exemplified:
(a) a slurry-form coating liquid is prepared by dispersing 1 to 1500 parts by weight of a filler with respect to 100 parts by weight of a heat-resistant resin into a solution of a polar organic solvent containing 100 parts by weight of a heat-resistant resin;
(b) the coating liquid is applied on at least one side of a porous film to form a applied film; and
(c) a heat-resistant resin is precipitated from the applied film by means of moistening, solvent removal or immersion into a solvent, which does not dissolve the heat-resistant resin, and then, followed by, if required, drying.

A coating liquid is preferably applied continuously by a coating device described in JP2001-316006A, and a process described in JP2001-23602A.

Concerning a solution of a polar organic solvent, if the heat-resistant resin is a para-aramid, as a polar organic solvent can be used a polar amide solvent or a polar urea solvent. Specific examples thereof include, but not limited to, N,N-dimethylformamide, N,N-dimethylacetamide, N-methyl-2-pyrrolidone (NMP), and tetramethyl urea.

In case a para-amid is used as a heat-resistant resin, it is preferable to add chloride of an alkali metal or an alkaline-earth metal during a polymerization of a para-amid, in order to improve the solubility of the para-amid into a solvent. Specific examples thereof include, but not limited to, lithium chloride and calcium chloride. The amount of such a chloride to be added into a polymerization system is preferably, based on 1.0 mol of an amide group to be formed by condensation polymerization, in a range of 0.5 to 6.0 mol, and more preferably in a range of 1.0 to 4.0 mol. In case a chloride is less than 0.5 mol, the solubility of a para-amid to be formed may be occasionally insufficient, and in case it exceeds 6.0 mol, it exceeds substantially the solubility of a chloride in the solvent, which is occasionally unfavorable. Generally, in case a chloride of an alkali metal or an alkaline-earth metal is less than 2 weight-%, the solubility of a para-amid may be occasionally insufficient, and in case it exceeds 10 weight-%, the chloride of an alkali metal or an alkaline-earth metal may be occasionally not soluble in a polar organic solvent such as a polar amide solvent and a polar urea solvent.

In case a heat-resistant resin is an aromatic polyimide, as a polar organic solvent to dissolve an aromatic polyimide, in addition to the exemplified solvents to dissolve an aramid, dimethylsulfoxide, cresol, o-chlorophenol, etc. can be favorably used.

For a process for dispersing a filler to yield a slurry-form coating liquid, as an apparatus therefor, a high pressure homogenizer (Gaullin Homogenizer, and nanomizer), etc. may be used favorably.

Examples of a process for applying a slurry-form coating liquid include a knife-, blade-, bar-, gravure-, die-coating processes, and a bar- and knife-coating processes are simple, but industrially a die coating process with a structure, by which a solution does not contact an atmosphere, is preferable. Applying may be conducted twice or more. Such a repeated applying is usually conducted after the precipitation of a heat-resistant resin according to the step (c) above.

In case a heat-resistant porous layer and a porous film is manufactured separately and laminated together, they should better be fixed by an adhesive or by heat-sealing.

Instead of a nonaqueous electrolyte solution, a solid electrolyte may be used. As a solid electrolyte, a dispersion of one of the aforedescribed electrolyte in a resin may be also used. In case a solid electrolyte is used in a sodium secondary battery, the solid electrolyte may act as a separator, and a separator may not be required.

A sodium secondary battery is usually manufactured by placing an electrode assembly prepared by laminating or winding a negative electrode, a separator and a positive electrode, into a container such as a battery can, and then impregnating an electrolyte solution containing an electrolyte.

A manufacturing example of a sodium secondary battery will be described below.

As for a manufacturing example of a coin-shaped sodium secondary battery, a process of piling up successively a metallic container (11) of a stainless steel, etc., an electrode (current collector (12) and electrode material (13)), a separator (14), an electrode (electrode material (13) and current collector (12)); impregnating an electrolyte solution; and sealing with a metallic lid (15) and a gasket (16) as shown in FIG. 1, is exemplified.

Figure 2:
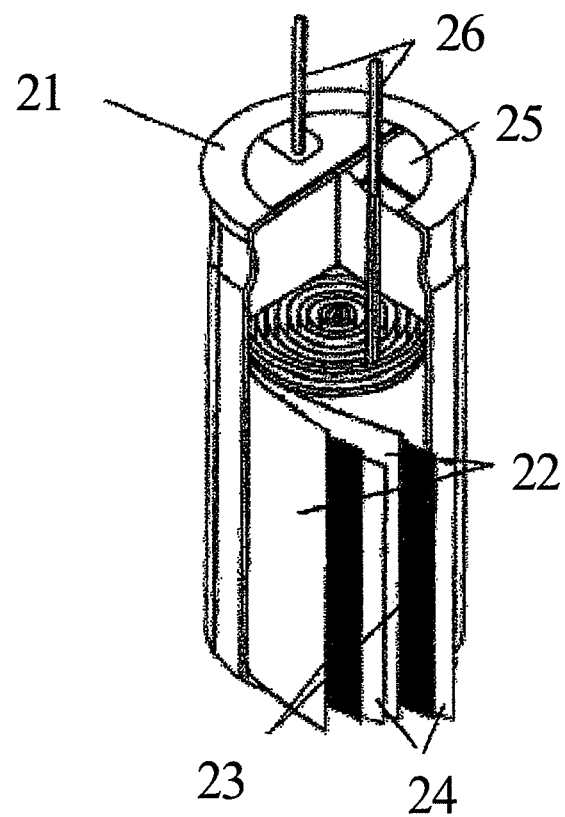
FIG. 2 shows an example (schematic view) of a cylindrical sodium secondary battery.

Further, as for a manufacturing example of a cylindrical sodium secondary battery, a process for winding two sheets of electrodes (current collectors (22) and electrode material (23)) sandwiching a separator (24); placing the same in a cylindrical metallic container (21) made of aluminium, a stainless steel, etc.; impregnating an electrolyte solution; and sealing with an electrode sealing plate (25) as shown in FIG. 2, is exemplified. In case of a square-shaped sodium secondary battery, a square-shaped metallic container is used. Meanwhile, the electrodes are provided with leads (26), and one of the electrode leads (26) functions as a positive electrode, the other electrode lead (26) functions as a negative electrode, and electricity is charged and discharged.

Further, instead of a metallic container, a sack-like package made of a laminated sheet containing aluminium may be used.

A sodium secondary battery is charged usually at an about 0.1 to 20 hour charging rate, and more preferably 0.5 to 5 hour charging rate. With a sodium secondary battery, decrease of the charge-discharge capacity tends to be suppressed favorably, even if rapid charge and discharge faster than 5 hour charging rate is repeated.

The hour charging rate in the above means a value (h) to be determined by dividing a charge-discharge capacity (mA·h) required for charging 100% by a constant current value (mA) for charging, and a larger value of the same indicates that charging can be completed within a shorter time.

EXAMPLES

The present invention will now be described in more detail by means of examples.

Example 1

Production Example 1 for Manufacturing Carbonaceous Material

A powder of a phenol resin (powdery phenol resin, Sumiliteresin PR-217 (trade name)) on an alumina boat was placed in a ring furnace, and kept there at 1000° C. in an argon gas atmosphere for carbonizing the phenol resin powder. The argon gas flow rate in the furnace was 0.1 L/min per 1 g of the phenol resin powder, the temperature increase rate from the room temperature up to 1000° C. was about 5° C./min and the retention time at 1000° C. was 1 hour. After the carbonization, the product was milled by a ball mill (agate balls, 28 rpm, 5 min), to yield a powdery carbonaceous material. The mean powder size was 50 μm or less. The mean powder size was measured as a volume mean diameter, by dispersing the carbonaceous material in an aqueous solution containing a neutral detergent and measured by a laser diffraction particle size distribution analyzer SALD2000J (registered trademark, by Shimadzu Corporation). The BET specific surface area of the obtained carbonaceous material was 450 $m^2/g$. The BET specific surface area was determined by calculating a nitrogen adsorption isotherm measured by AUTOSORB (by Yuasa Ionics Inc.) at a liquid nitrogen temperature. A sodium secondary battery was manufactured as follows using the obtained carbonaceous material, and the sodium ion doping property was examined.

(1-1) Manufacture of a Second Electrode

The carbonaceous material and poly(vinylidene fluoride) (PVDF) as a binder were weighed to a weight ratio of carbonaceous material:binder=85:15, and the binder was dissolved in N-methylpyrrolidone (NMP), to which the carbonaceous material was added to form a slurry. The slurry was then applied on a current collector of a 10 μm-thick copper foil by a coating device, followed by drying by a drier to yield an electrode sheet. The electrode sheet was punched out by an electrode puncher to complete a 1.5 cm-diameter round electrode (EA1).

(1-2) Raman Spectrometric Measurement

A Raman spectrometric measurement was conducted on the electrode (EA1), to find the R value to be 1.29. Further, with respect to a fitting spectrum of the Raman spectrometric measurement the $B_1$ value was 60 $cm^{-1}$ and the NR value was 0.88.

(2-1) Manufacture of Sodium Secondary Battery 1

In a cavity of a lower part of a coin cell case (by Hohsen Corp.), a second electrode (EA1) was placed facing down a copper foil surface, a separator (a porous film of polypropylene) was placed thereon, and an electrolyte solution (1M $NaClO_4$/propylene carbonate) was injected. Using a first electrode (a metallic sodium foil), the metallic sodium foil and an internal lid were combined and placed on the upper side of the separator facing down a metallic sodium foil surface, and sandwiching a gasket an upper part was capped and caulked by a caulking device to complete a sodium secondary battery (TB1). The assembly of the secondary battery was carried out in an argon atmosphere in a glove box.

(2-2) Charging and Discharging Test

A charging and discharging test was conducted by repeating charge and discharge at constant current according to the following conditions.

Charging and discharging conditions:
Charging (doping of sodium ions to a second electrode) was conducted by constant current charging at 0.05 mA/$cm^2$ (10 mA per 1 g of a carbonaceous material) up to 0.005 V. Discharging (dedoping of sodium ions from a second electrode) was conducted by constant current discharging at 0.05 mA/$cm^2$ (10 mA per 1 g of a carbonaceous material), and only the first discharging was cut off at the voltage of 1.5 V, and the second and further discharging was cut off at the voltage of 1 V.

(2-3) Results of Charging and Discharging Test

The first discharge capacity was 245 mA·h/g. Based on the discharge capacity at the second cycle, the discharge capacity at the 10th cycle was 98%, indicating good charge and discharge characteristics. Further, according to a measurement of the charge and discharge curve at the 10th cycle, the charge capacity and the discharge capacity were almost identical, indicating that the charge and discharge characteristics were good.

(3-1) Manufacture of Sodium Secondary Battery 2

Firstly, a first electrode was prepared as follows. In an argon atmosphere in a glove box, $Na_2O_2$ (by Fluka Chemie, AG) and $Fe_3O_4$ (by Aldrich Chemical Company, Inc.) were weighed out respectively, so that Na and Fe corresponded to a stoichiometric ratio in $NaFeO_2$, and mixed well in a agate mortar. The obtained mixture was placed into an alumina crucible, which was then put into an electric furnace communicated with a glove box, whose atmosphere was evacuated by a vacuum pump and replaced with introduced argon in advance, and replacing the atmosphere in the furnace with argon, the temperature was started elevating. Just before reaching 100° C., the inside of the electric furnace was opened to air, and thereafter the heating was continued in the atmosphere of air. After the mixture was kept at 650° C. for 12 hours, it was taken out therefrom to obtain a Na compound (MC1). The obtained Na compound (MC1) and a conductive additive were weighed out to a ratio of 75:25, and mixed in an agate mortar. Then poly(vinylidene fluoride) (PVDF) was weighed out as a binder to a ratio of MC1:conductive additive:binder=70:25:5 (weight ratio), the binder was dissolved in N-methylpyrrolidone (NMP), to which the MC1 and the conductive additive were added to form a slurry. The slurry was then applied on a current collector of a 40 μm-thick aluminium foil by a coating device, followed by drying by a drier to yield an electrode sheet. The electrode sheet was punched out by an electrode puncher to complete a 1.45 cm-diameter round first electrode (EC1). In a cavity of a lower part of a coin cell case (by Hohsen Corp.), a first electrode (EC1) was placed facing down an aluminium foil surface, a separator (a porous film of polypropylene) was placed thereon, and an electrolyte solution (1 M $NaClO_4$/propylene carbonate) was injected. Using a second electrode (EA1), the EA1 and an internal lid were combined and placed on the upper side of the separator facing down a side of the EA1 coated with a carbonaceous material, and sandwiching a gasket an upper part was capped and caulked by a caulking device to manufacture a sodium secondary battery (TIB1). The assembly of the secondary battery was carried out in an argon atmosphere in a glove box. The sodium secondary battery (TIB1) proved to have good charge and discharge characteristics. The TIB1 showed no sign of bulging even after the charging and discharging test. The charging and discharging conditions of the sodium secondary battery to be applied to the TIB1 are shown as follows:

Charging was conducted by constant current at 0.1 mA up to 4.0 V.

Discharging was conducted by constant current at 0.1 mA, which was cut off at the voltage of 1.5 V.

Ten cycles of charge and discharge were conducted.

Example 2

Production Example 2 for Manufacturing Carbonaceous Material

A liquid composition containing alkyl aromatic hydrocarbons was oxidized to a liquid composition containing aromatic hydroperoxides, which was brought into contact with an aqueous alkali solution to extract the aromatic hydroperoxides in an oil phase. The resulted oil phase was brought into contact with an acid to decompose acidly the hydroperoxides, converting the oil phase to that containing resorcinol, which was then separated to resorcinol and a low boiling components including an organic solvent and tar, to obtain tar. The tar was used as a residual oil at the production of resorcinol, and was placed in a ring furnace on an alumina boat, and kept there at 1000° C. in an argon gas atmosphere for carbonizing the residual oil. The argon gas flow rate in the furnace was 0.1 L/min per 1 g of the residual oil, the temperature increase rate from the room temperature up to 1000° C. was about 5° C./rain and the retention time at 1000° C. was 1 hour. After the carbonization, the product was milled by a ball mill (agate balls, 28 rpm, 5 min), to yield a powdery carbonaceous material. The BET specific surface area of the carbonaceous material was 20 $m^2$/g. A sodium secondary battery was manufactured as follows using the obtained carbonaceous material, and the sodium ion doping property was examined.

(1) Manufacture of a Sodium Secondary Battery and Raman Spectrometric Measurement Using the carbonaceous material obtained by the production example 2 for manufacturing carbonaceous material, a round electrode (EA2) was manufactured as in Example 1. A Raman spectrometric measurement was conducted on the electrode (EA2), to find the R value to be 1.16. Further, with respect to a fitting spectrum of the Raman spectrometric measurement the $B_1$ value was 85 $cm^{-1}$ and the NR value was 0.66.

(2) Manufacture of a Sodium Secondary Battery 1

Using the second electrode (EA2), a sodium secondary battery (TB2) was manufactured as in Example 1 (2-1), and a charging and discharging test was conducted as in Example 1 to find that the first discharge capacity was 264 mA·h/g. Based on the discharge capacity at the second cycle, the discharge capacity at the 10th cycle was 97%, indicating good charge and discharge characteristics. Further, according to a measurement of the charge and discharge curve at the 10th cycle, the charge capacity and the discharge capacity were almost identical, indicating that the charge and discharge characteristics were good.

(3) Manufacture of a Sodium Secondary Battery 2

Using the second electrode (EA2), a sodium secondary battery (TIB2) was manufactured as in Example 1 (3-1). The sodium secondary battery (TIB2) proved to have good charge and discharge characteristics. The TIB2 showed no sign of bulging even after the charging and discharging test. The charging and discharging conditions to be applied to the TIB2 were identical with those to the TIB1.

Example 3

A commercially available carbonaceous material powder (Nicabeads ICB-0510 (trade name), by Nippon Carbon Co., Ltd.) was used as a carbonaceous material.

(1) Manufacture of Second Electrode and Raman Spectrometric Measurement

Using the carbonaceous material (ICB-0510), a round electrode (EA3) was manufactured as in Example 1. A Raman spectrometric measurement was conducted on the electrode (EA3), to find the R value to be 1.35. Further, with respect to a fitting spectrum of the Raman spectrometric measurement the $B_1$ value was 55 $cm^{-1}$ and the NR value was 0.94.

(2) Manufacture of a Sodium Secondary Battery 1

Using the second electrode (EA3), a sodium secondary battery (TB3) was manufactured as in Example 1 (2-1), and a charging and discharging test was conducted as in Example 1 to find that the first discharge capacity was 256 mA·h/g. Based on the discharge capacity at the second cycle, the discharge capacity at the 10th cycle was 97%, indicating good charge and discharge characteristics. Further, according to a measurement of the charge and discharge curve at the 10th cycle, the charge capacity and the discharge capacity were almost identical, indicating that the charge and discharge characteristics were good.

(3) Manufacture of a Sodium Secondary Battery 2

Using the second electrode (EA3), a sodium secondary battery (TIB3) was manufactured as in Example 1 (3-1). The sodium secondary battery (TIB3) proved to have good charge and discharge characteristics. The TIB3 showed no sign of bulging even after the charging and discharging test. The charging and discharging conditions for the sodium secondary battery to be applied to the TIB3 were identical with those to the TIB1.

The high temperature storage property of the TIB3 was examined as follows. The charge and discharge as above were repeated twice with the TIB3 in a thermostatic chamber at 25° C., and after the third charge it was left standing in a thermostatic chamber at 60° C. for a week. Then it was taken out, and the third discharge was conducted in a thermostatic chamber at 25° C.

Based on the second discharge capacity, the third discharge capacity was 90%, which was found to be very high. This indicates that a sodium secondary battery can be very advantageously applicable to a transportation equipment use, such as an automobile, and a stationary use, such as an accumulator for a solar cell, and an accumulator for wind power generation.

Example 4

A commercially available carbonaceous material powder (Nicabeads ICB-0520 (trade name), by Nippon Carbon Co., Ltd.) was used as a carbonaceous material.

(1) Manufacture of Second Electrode and Raman Spectrometric Measurement

Using the carbonaceous material (ICB-0520), a round electrode (EA4) was manufactured as in Example 1. A Raman spectrometric measurement was conducted on the electrode (EA4), to find the R value to be 1.72. Further, with respect to a fitting spectrum of the Raman spectrometric measurement the $B_1$ value was 30 $cm^{-1}$ and the NR value was 1.93.

(2) Manufacture of a Sodium Secondary Battery 1

Using the second electrode (EA4), a sodium secondary battery (TB4) was manufactured as in Example 1 (2-1), and a charging and discharging test was conducted as in Example 1 to find that the first discharge capacity was 249 mA·h/g. Based on the discharge capacity at the second cycle, the discharge capacity at the 10th cycle was 81%, indicating good charge and discharge characteristics. Further, according to a measurement of the charge and discharge curve at the 10th cycle, the charge capacity and the discharge capacity were almost identical, indicating that the charge and discharge characteristics were good.

(3) Manufacture of a Sodium Secondary Battery 2

Using the second electrode (EA4), a sodium secondary battery (TIB4) was manufactured as in Example 1 (3-1). The sodium secondary battery (TIB4) had good charge and discharge characteristics. Further, by substituting 1 M $NaClO_4$/(equimolar mixture of ethylene carbonate and dimethyl carbonate) for the electrolyte solution of the TIB4 (1 M $NaClO_4$/propylene carbonate), similar effect on the charge and discharge characteristics as with TIB4 could be achieved. The TIB4 showed no sign of bulging even after the charging and discharging test. The charging and discharging conditions to be applied to the TIB4 were identical with those to the TIB1.

Example 5

Production Example 5 for Manufacturing Carbonaceous Material

Sawdust ejected by sawing lumber was placed in a ring furnace on an alumina boat, and kept there at 1000° C. in an argon gas atmosphere for carbonizing the sawdust. The argon gas flow rate in the furnace was 0.1 L/min per 1 g of the sawdust, the temperature increase rate from the room temperature up to 1000° C. was about 5° C./min and the retention time at 1000° C. was 1 hour. After the carbonization, the product was milled by a ball mill (agate balls, 28 rpm, 5 min), to yield a powdery carbonaceous material. The BET specific surface area of the carbonaceous material was 126 m²/g. A sodium secondary battery was manufactured as follows using the obtained carbonaceous material, and the sodium ion doping property was examined.

(1) Manufacture of Second Electrode and Raman Spectrometric Measurement

Using the carbonaceous material prepared by the Example 5 for manufacturing carbonaceous material, a round electrode (EA5) was manufactured as in Example 1. A Raman spectrometric measurement was conducted on the electrode (EA5), to find the R value to be 1.10. Further, with respect to a fitting spectrum of the Raman spectrometric measurement the $B_1$ value was 95 cm$^{-1}$ and the NR value was 0.62.

(2) Manufacture of a Sodium Secondary Battery 1

Using the second electrode (EA5), a sodium secondary battery (TB5) was manufactured as in Example 1 (2-1), and a charging and discharging test was conducted as in Example 1 to find that the first discharge capacity was 223 mA·h/g. Based on the discharge capacity at the second cycle, the discharge capacity at the 10th cycle was 99%, indicating good charge and discharge characteristics. Further, according to a measurement of the charge and discharge curve at the 10th cycle, the charge capacity and the discharge capacity were almost identical, indicating that the charge and discharge characteristics were good.

(3) Manufacture of a Sodium Secondary Battery 2

Using the second electrode (EA5), a sodium secondary battery (TIB5) was manufactured as in Example 1 (3-1). The sodium secondary battery (TIB5) was proved to have good charge and discharge characteristics. Further, the TIB5 showed no sign of bulging even after the charging and discharging test. The charging and discharging conditions to be applied to the TIB5 were identical with those to the TIB1.

Comparative Example 1

A commercially available natural graphite (high purity natural graphite SNO, by SEC Carbon Ltd.) was used as a carbonaceous material.

(1) Manufacture of Second Electrode and Raman Spectrometric Measurement

Using the carbonaceous material (high purity natural graphite SNO), a round electrode (REA1) was manufactured as in Example 1. A Raman spectrometric measurement was conducted on the electrode (REA1), to find the R value to be 0.23. Further, with respect to a fitting spectrum of the Raman spectrometric measurement the $B_1$ value was 19 cm$^{-1}$ and the NR value was 0.13.

(2) Manufacture of a Sodium Secondary Battery 1

Using the second electrode (REA1), a sodium secondary battery (RTB1) was manufactured as in Example 1 (2-1), and a charging and discharging test was tried as in Example 1. But at the first charge, the potential did not go down below 0.5 V, and the charging could not be completed even after a lapse of 100 hours. Further, by substituting 1 M NaClO$_4$/ (equimolar mixture of ethylene carbonate and dimethyl carbonate) for the electrolyte solution (1 M NaClO$_4$/propylene carbonate), both the charge and discharge were 10 mA·h/g or less, and the charge-discharge capacity was not sufficient.

(3) Manufacture of a Sodium Secondary Battery 2

Using the second electrode (REA1), a sodium secondary battery (RTIB1) was manufactured as in Example 1 (3-1). The sodium secondary battery (RTIB1) did not work fully as a secondary battery. By substituting 1 M NaClO$_4$/(equimolar mixture of ethylene carbonate and dimethyl carbonate) for the electrolyte solution (1 M NaClO$_4$/propylene carbonate), it did not work fully as a secondary battery.

Comparative Example 2

A commercially available natural graphite (high purity natural graphite SGO, by SEC Carbon Ltd.) was used as a carbonaceous material.

(1) Manufacture of Second Electrode and Raman Spectrometric Measurement

Using the carbonaceous material (high purity natural graphite SGO), a round electrode (REA2) was manufactured as in Example 1. A Raman spectrometric measurement was conducted on the electrode (REA2), but there was no peak found in the Raman spectrum in a range of the horizontal axis of 1570 to 1620 cm$^{-1}$.

(2) Manufacture of a Sodium Secondary Battery 1

Using the second electrode (REA2), a sodium secondary battery (RTB2) was manufactured as in Example 1 (2-1), and a charging and discharging test was tried as in Example 1. But at the first charge, the potential did not go down below 0.5 V, and the charging could not be completed even after a lapse of 100 hours. Further, by substituting 1 M NaClO$_4$/ (equimolar mixture of ethylene carbonate and dimethyl carbonate) for the electrolyte solution (1 M NaClO$_4$/propylene carbonate), both the charge and discharge were 10 mA·h/g or less, and the charge-discharge capacity was not sufficient.

(3) Manufacture of a Sodium Secondary Battery 2

Using the second electrode (REA2), a sodium secondary battery (RTIB2) was manufactured as in Example 1 (3-1). The sodium secondary battery (RTIB2) did not work fully as a secondary battery. By substituting 1 M NaClO$_4$/(equimolar mixture of ethylene carbonate and dimethyl carbonate) for the electrolyte solution (1 M NaClO$_4$/propylene carbonate), it did not work fully as a secondary battery.

Comparative Example 3

A commercially available carbonaceous material powder (meso-carbon micro-beads, MCMB-6-10, by Osaka Gas Chemicals Co., Ltd.) was used as a carbonaceous material.

(1) Manufacture of Second Electrode and Raman Spectrometric Measurement

Using the carbonaceous material (MCMB-6-10), a round electrode (REA3) was manufactured as in Example 1. A Raman spectrometric measurement was conducted on the electrode (REA3), to find the R value to be 1.01. Further, with respect to a fitting spectrum of the Raman spectrometric measurement the $B_1$ value was 78 cm$^{-1}$ and the NR value was 0.49.

(2) Manufacture of a Sodium Secondary Battery 1

Using the second electrode (REA3), a sodium secondary battery (RTB3) was manufactured as in Example 1 (2-1), and a charging and discharging test was conducted as in Example 1 to find that the first discharge capacity was 48 mA·h/g. Based on the discharge capacity at the second cycle, the discharge capacity at the 10th cycle was 12%.

(3) Manufacture of a Sodium Secondary Battery 2

Using the second electrode (REA3), a sodium secondary battery (RTIB3) was manufactured as in Example 1 (3-1). With the sodium secondary battery (RTIB3) charge-discharge was repeated, and at the third cycle the charge and discharge capacities became almost 0 mA·h without fully working as a secondary battery. By substituting 1 M NaClO$_4$/(equimolar mixture of ethylene carbonate and dimethyl carbonate) for the electrolyte solution (1 M NaClO$_4$/propylene carbonate), it did not work fully as a secondary battery.

Comparative Example 4

A commercially available carbonaceous material powder (meso-carbon micro-beads, MCMB-6-28, by Osaka Gas Chemicals Co., Ltd.) was used as a carbonaceous material.
(1) Manufacture of Second Electrode and Raman Spectrometric Measurement Using the carbonaceous material (MCMB-6-28), a round electrode (REA4) was manufactured as in Example 1. A Raman spectrometric measurement was conducted on the electrode (REA4), to find the R value to be 0.18. Further, with respect to a fitting spectrum of the Raman spectrometric measurement the B$_1$ value was 18 cm$^{-1}$ and the NR value was 0.12.
(2) Manufacture of a Sodium Secondary Battery 1

Using the second electrode (REA4), a sodium secondary battery (RTB4) was manufactured as in Example 1 (2-1), and a charging and discharging test was tried as in Example 1, but the charging could not be completed even after a lapse of 100 hours. Further, by substituting 1 M NaClO$_4$/(equimolar mixture of ethylene carbonate and dimethyl carbonate) for the electrolyte solution (1 M NaClO$_4$/propylene carbonate), both the charge and discharge were 10 mA·h/g or less, and the charge-discharge capacity was not sufficient.
(3) Manufacture of a Sodium Secondary Battery 2

Using the second electrode (REA4), a sodium secondary battery (RTIB4) was manufactured as in Example 1 (3-1). The sodium secondary battery (RTIB4) did not work fully as a secondary battery. By substituting 1 M NaClO$_4$/(equimolar mixture of ethylene carbonate and dimethyl carbonate) for the electrolyte solution (1 M NaClO$_4$/propylene carbonate), it did not work fully as a secondary battery.

Comparative Example 5

A commercially available carbonaceous material powder (Tokablack TB#2500, by Tokai Carbon Co., Ltd.) was used as a carbonaceous material.
(1) Manufacture of Second Electrode and Raman Spectrometric Measurement Using the carbonaceous material (TB#2500), a round electrode (REA5) was manufactured as in Example 1. A Raman spectrometric measurement was conducted on the electrode (REA5), to find the R value to be 1.04. Further, with respect to a fitting spectrum of the Raman spectrometric measurement the B$_1$ value was 108 cm$^{-1}$ and the NR value was 0.50.
(2) Manufacture of a Sodium Secondary Battery 1

Using the second electrode (REA5), a sodium secondary battery (RTB5) was manufactured as in Example 1 (2-1), and a charging and discharging test was conducted as in Example 1 to find that the first discharge capacity was 50 mA·h/g.
(3) Manufacture of a Sodium Secondary Battery 2

Using the second electrode (REA5), a sodium secondary battery (RTIB5) was manufactured as in Example 1 (3-1). With the sodium secondary battery (RTIB5) charge-discharge was repeated, and at the tenth cycle the charge and discharge capacities became almost 0 mA·h without fully working as a secondary battery. By substituting 1 M NaClO$_4$/(equimolar mixture of ethylene carbonate and dimethyl carbonate) for the electrolyte solution (1 M NaClO$_4$/propylene carbonate), still did it not work fully as a secondary battery.

Comparative Example 6

A commercially available carbonaceous material powder (Tokablack TB#2545, by Tokai Carbon Co., Ltd.) was used as a carbonaceous material.
(1) Manufacture of Second Electrode and Raman Spectrometric Measurement Using the carbonaceous material (TB#2545), a round electrode (REA6) was manufactured as in Example 1. A Raman spectrometric measurement was conducted on the electrode (REA6), to find the R value to be 1.06. Further, with respect to a fitting spectrum of the Raman spectrometric measurement the B$_1$ value was 90 cm$^{-1}$ and the NR value was 0.61.
(2) Manufacture of a Sodium Secondary Battery 1

Using the second electrode (REA6), a sodium secondary battery (RTB6) was manufactured as in Example 1 (2-1), and a charging and discharging test was conducted as in Example 1 to find that the first discharge capacity was 29 mA·h/g.
(3) Manufacture of a Sodium Secondary Battery 2

Using the second electrode (REA6), a sodium secondary battery (RTIB6) was manufactured as in Example 1 (3-1). With the sodium secondary battery (RTIB6) charge-discharge was repeated, and at the tenth cycle the charge and discharge capacities became almost 0 mA·h without fully working as a secondary battery. By substituting 1 M NaClO$_4$/(equimolar mixture of ethylene carbonate and dimethyl carbonate) for the electrolyte solution (1 M NaClO$_4$/propylene carbonate), still did it not work fully as a secondary battery.

Example 6

Production Example of Manufacture of Laminated Film (1) Preparation of Coating Liquid After 272.7 g of calcium chloride was dissolved in 4200 g of NMP, 132.9 g of p-phenylenediamine was added and dissolved completely. To the resulted solution, 243.3 g of terephthalic acid dichloride (hereinafter abbreviated as TPC) was added gradually to cause polymerization and yield a para-aramid. By diluting additionally with NMP, a 2.0 weight-% para-aramid solution (A) was prepared. To 100 g of the prepared para-aramid solution, 2 g of alumina powder (a) (Alumina C, by Nippon Aerosil Co., Ltd., mean particle size 0.02 μm (corresponding to D$_2$), almost spherical particle form, particle aspect ratio of 1) and 2 g of alumina powder (b) (Sumicorundum AA03, by Sumitomo Chemical Co., Ltd., mean particle size 0.3 μm (corresponding to D$_1$), almost spherical particle form, particle aspect ratio of 1) were added as fillers (total 4 g), mixed, treated three times by a nanomizer, filtered through a 1-000 mesh wire gauze, and degassed under a reduced pressure to yield a slurry form coating liquid (B). The weight of the alumina powders (fillers) was equivalent to 67 weight % of the total weight of the para-aramid and the alumina powders. The D$_2$/D$_1$ was equivalent to 0.07.
(2) Manufacture of Laminated Film As a porous film was used a polyethylene porous film (film thickness 12 μm, air permeance 140 sec/100 cc, mean pore size 0.1 μm, porosity 50%). Fixing the polyethylene porous film on a 100 µm-thick PET film, the slurry form coating liquid (B) was coated on the porous film by a bar coater (by Tester Sangyo Co., Ltd.). The PET film integrated with the coated porous film was immersed into water, which was a poor solvent, to separate a para-aramid porous layer (a heat-resistant porous layer), and after removing the solvent a laminated film 1 compose of the heat-resistant porous layer and the porous film was complete. The thickness of the laminated film 1 was 16 µm, and the thickness of the para-aramid porous layer (the heat-resistant porous layer) was 4 µm. The air permeance of the laminated film 1 was 180 sec/100 cc, and the porosity was 50%. According to observation by a scanning electron microscope (SEM) of a section of the heat-resistant porous layer in the laminated film 1, it became clear that it had smaller micro-pores of about 0.03 µm to 0.06 µm and larger micro-pores of about 0.1 µm to 1 µm. Further as described above, a para-aramid, which was an aromatic polymer containing nitrogen, was used for the heat-resistant porous layer of the laminated film 1, and the thermal rupture temperature of the laminated film 1 was about 400° C. The laminated film was evaluated according to the following methods.

(3) Evaluation of Laminated Film (A) Thickness Measurement

The thickness of a laminated film or a porous film was measured according to JIS Standard (K7130-1992). The thickness of a heat-resistant porous layer was determined by deducing the thickness of a porous film from the thickness of a laminated film.

(B) Measurement of Air Permeance by Gurley Method

The air permeance of a laminated film was measured according to JIS P8117 by a Gurley densometer with a digital timer (by Yasuda Seiki Seisakusho Ltd.).

(C) Porosity

A square with side length of 10 cm was cut from the manufactured laminated film as a sample, and the weight W (g) and the thickness D (cm) thereof were measured. The weight (Wi (g)) of each layer in the sample was determined, from the Wi and the true density (true density i (g/cm$^3$)) of a material of each layer the volume of each layer was determined, and the porosity (volume-%) was calculated from the following formula.

porosity(volume-%)=100×[1−($W$1/true density 1+$W$2/true density 2+ . . . +$Wn$/true density $n$)/(10×10×$D$)]

Manufacture of Sodium Secondary Battery and Evaluation Results

Using the carbonaceous material manufactured in Example 1 for manufacturing carbonaceous material, a sodium secondary battery TIB6 was manufactured identically with Example 1 (3-1) except that as a separator the above-recited laminated film was used instead of the polypropylene porous film. It was found that the obtained sodium secondary battery TIB6 had excellent charge and discharge characteristics. There was no bulging observed in TIB6 after a charge-discharge test. The charging and discharging conditions to be applied to the TIB6 were identical with those to the TIB1.

Example 7

A small-angle X-ray scattering measurement described above was conducted on the carbonaceous material manufactured in Example 1 (Example 1 for manufacturing carbonaceous material) to find the A value of −0.20 and the $\sigma_A$ value of 0.006.

Example 8

A small-angle X-ray scattering measurement described above was conducted on the carbonaceous material in Example 3 to find the A value of 0.13 and the $\sigma_A$ value of 0.003.

Comparative Example 7

A small-angle X-ray scattering measurement described above was conducted on the carbonaceous material in Comparative Example 1 to find the A value of 0.61 and the $\sigma_A$ value of 0.012.

Comparative Example 8

A small-angle X-ray scattering measurement described above was conducted on the carbonaceous material in Comparative Example 3 to find the A value of −1.4 and the $\sigma_A$ value of 0.013.

Example 9

Using a sodium secondary battery (TB9) manufactured identically with TB1 in Example 1, charging and discharging were respectively carried out once under the charging and discharging conditions described in Example 1 (2-2), and an electrode mixture was recovered according to the aforedescribed method from TB9 after the charging and discharging test. By an FIB, a slice thereof with a uniform thickness (about 100 nm) was prepared, and a TEM image (bright-field image) thereof by a transmission electron microscope (TEM) at an acceleration voltage of 200 kV was observed to find no pores of 10 nm or larger in the carbonaceous material.

Example 10

Using a sodium secondary battery (TB10) manufactured identically with TB2 in Example 2, charging and discharging were respectively carried out once under the charging and discharging conditions described in Example 1 (2-2), and an electrode mixture was recovered according to the aforedescribed method from TB10 after the charging and discharging test. By an FIB, a slice thereof with a uniform thickness (about 100 nm) was prepared and a TEM image (bright-field image) thereof by a transmission electron microscope (TEM) at an acceleration voltage of 200 kV was observed to find no pores of 10 nm or larger in the carbonaceous material.

Example 11

Using a sodium secondary battery (TB11) manufactured identically with TB3 in Example 3, charging was carried out under the charging conditions described in Example 1 (2-2), and an electrode mixture was recovered according to the aforedescribed method from TB11 after the charge. The $Q_1$ thereof was determined according to the method described above by a calorimetric differential thermal analysis apparatus DCS200 (trade name) by Seiko Instruments Inc. as 726 Joules/g. Further, the $Q_2$ was determined as 44 Joules/g. The $Q_3$ was determined as 0 Joule/g.

Example 12

The carbonaceous material prepared by Example 1 (Production Example 1 for manufacturing carbonaceous material) and a non-fluorinated polymer (carboxymethylcellulose) as a binder were weighed out to carbonaceous material:binder=96:4 (by weight), and the binder was dissolved in water, to which the carbonaceous material was mixed to form a slurry. The slurry was applied on a 10 μm-thick copper foil as a current collector by a coating device, dried by a drier to yield an electrode sheet. The electrode sheet was punched out by an electrode puncher to complete a 1.5 cm-diameter round electrode (EA12).

(2) Manufacture of a Sodium Secondary Battery 1

Using the second electrode (EA12), a sodium secondary battery (TB12) was manufactured as in Example 1 (2-1). A charging and discharging test was conducted as in Example 1 to find that the first charge-discharge efficiency was 83%. Further, based on the discharge capacity at the second cycle, the discharge capacity at the 10th cycle was 98%, indicating still better charge and discharge characteristics than TB1, which was manufactured with an electrode using PVDF as a binder.

(3) Manufacture of a Sodium Secondary Battery 2

Using the second electrode (EA12), a sodium secondary battery (TIB12) was manufactured as in Example 1 (3-1). The sodium secondary battery (TIB12) proved to have good charge and discharge characteristics. The TIB12 showed no sign of bulging even after the charging and discharging test. The charging and discharging conditions to be applied to the TIB12 were identical to those of the TIB1.

Example 13

Using a sodium secondary battery (TB13) manufactured identically with TB1 in Example 1, charging was carried out under the charging conditions described in Example 1 (2-2), and an electrode mixture was recovered according to the aforedescribed method from TB13 after the charge. The $Q_1$ thereof was determined according to the method described above by a calorimetric differential thermal analysis apparatus DCS200 (trade name) by Seiko Instruments Inc. as 699 Joules/g. Further, the $Q_2$ was determined as 5 Joules/g. The $Q_3$ was determined as 0 Joule/g.

Example 14

Using a sodium secondary battery (TB14) manufactured identically with TB3 in Example 3, charging and discharging were respectively carried out once under the charging and discharging conditions described in Example 1 (2-2), and an electrode mixture was recovered according to the aforedescribed method from TB14 after the charging and discharging test. By an FIB, a slice thereof with a uniform thickness (about 200 nm) was prepared and a TEM image (bright-field image) thereof by a transmission electron microscope (TEM) at an acceleration voltage of 200 kV was observed to find no pores of 10 nm or larger in the carbonaceous material.

INDUSTRIAL APPLICABILITY

According to the present invention a sodium secondary battery with excellent charge and discharge characteristics, such as cycle characteristics, and charge-discharge capacity, can be provided. Further, since there is no need for using a rare metal, such as lithium, with resource constraint, a secondary battery with little environmental load can be produced at a lower cost. Further, a rapidly chargeable and dischargeable secondary battery can be provided.

The invention claimed is:

1. A sodium secondary battery comprising a first electrode and a second electrode including a carbonaceous material that satisfies the following requirement 1 and requirement 2, wherein the carbonaceous material of the sodium secondary battery contains no lithium:

Requirement 1: an R value (=ID/IG) determined by a Raman spectrometric measurement is 1.07 to 3, wherein the carbonaceous material is irradiated by laser with wavelength of 532 nm for Raman spectrometric measurement to obtain a Raman spectrum (the vertical axis y represents a scattered light intensity in any optional unit, and the horizontal axis x represents a Raman shift wave number ($cm^{-1}$)), the spectrum having each one peak in a range of 1300 to 1400 $cm^{-1}$ on the horizontal axis and a range of 1570 to 1620 $cm^{-1}$ on the horizontal axis; a fitting function is derived from the spectrum in a wave number range of 600 to 1740 $cm^{-1}$ by fitting with two Lorentz functions and a baseline function; a fitting spectrum is derived by reducing the baseline function therefrom; in the fitting spectrum, the maximum value along the vertical axis in a range of 1300 to 1400 $cm^{-1}$ on the horizontal axis is determined as ID and the maximum value along the vertical axis in a range of 1570 to 1620 $cm^{-1}$ on the horizontal axis is determined as IG; then ID is divided by IG to give the R value (=ID/IG);

Requirement 2: an A value determined by a small-angle X-ray scattering measurement is −0.5 to 0, and a $\sigma_A$ value is 0 to 0.010, wherein the carbonaceous material is examined to obtain a small-angle X-Ray scattering spectrum [the horizontal axis represents a wave number q ($nm^{-1}$), and the vertical axis represents S (=log (I)=common logarithm of scattering intensity I)], and the spectrum in a q range of 0.6 $nm^{-1}$ 1.8 $nm^{-1}$ is subjected to linear approximation by a least-squares method to obtain a slope of the line (A value) and a standard deviation ($\sigma_A$ value) thereof.

2. The sodium secondary battery according to claim 1, wherein the carbonaceous material is yielded by carbonization of an organic material having an aromatic ring.

3. The sodium secondary battery according to claim 2, wherein the organic material having an aromatic ring is yielded by polymerization of phenol or a derivative thereof and an aldehyde compound.

4. The sodium secondary battery according to claim 1, wherein the carbonaceous material is yielded by carbonization of an organic plant material.

5. The sodium secondary battery according to claim 4, wherein the carbonaceous material is charcoal.

6. The sodium secondary battery according to claim 1, wherein the carbonaceous material is yielded by carbonization of plant residual oil.

7. The sodium secondary battery according to claim 6, wherein the plant residual oil is a residual oil obtained in production of resorcinol.

8. The sodium secondary battery according to claim 1, wherein the carbonaceous material is not yet activated.

9. The sodium secondary battery according to claim 1, wherein the carbonaceous material is in a powder form and the BET specific surface area thereof is 1 $m^2$/g or higher.

10. The sodium secondary battery according to claim 1, wherein the first electrode is a positive electrode and the second electrode is a negative electrode.

11. The sodium secondary battery according to claim 1, wherein a separator is placed between the first electrode and the second electrode.

12. The sodium secondary battery according to claim 11, wherein the separator comprises a laminated film combining a heat-resistant porous layer and a porous film.

13. The sodium secondary battery according to claim 1, wherein the second electrode comprises a non-fluorinated polymer.

14. The sodium secondary battery according to claim 1, wherein the carbonaceous material that satisfies the following requirement 3:

Requirement 3: with respect to an electrode containing an electrode mixture prepared by mixing 85 parts by weight of the carbonaceous material and 15 parts by weight of poly(vinylidene fluoride), pores of not less than 10 nm do not exist substantially in the carbonaceous material in the electrode after being doped and dedoped with sodium ions.

15. The sodium secondary battery according to claim 1, wherein the carbonaceous material that satisfies the following requirement 4:

Requirement 4: a $Q_1$ value obtained by a calorimetric differential thermal analysis measurement is 800 Joules/g or less, wherein with respect to an electrode containing an electrode mixture prepared by mixing 85 parts by weight of the carbonaceous material and 15 parts by weight of poly(vinylidene fluoride), 1 mg of the electrode mixture in the electrode after sodium ion doping and 8 mg of a nonaqueous electrolyte solution (1 M concentration $NaClO_4$/propylene carbonate) are charged into a well closed container, using $\alpha\text{-}Al_2O_3$ as a reference, a calorimetric differential thermal analysis measurement is conducted at a temperature increase rate of 10° C./min in a range of 40° C. to 410° C. to obtain a total amount of generated heat $Q_1$ based on 1 g of the electrode mixture and the nonaqueous electrolyte solution in a range of 100° C. to 400° C.

\* \* \* \* \*